(12) United States Patent
Rubenstein

(10) Patent No.: US 11,146,632 B2
(45) Date of Patent: Oct. 12, 2021

(54) DATA BEACON PULSER(S) POWERED BY INFORMATION SLINGSHOT

(71) Applicant: UMBRA Technologies Limited, Hong Kong (CN)

(72) Inventor: Joseph E. Rubenstein, Beijing (CN)

(73) Assignee: UMBRA TECHNOLOGIES LTD., Hong Kong (CN)

( * ) Notice: Subject to any disclaimer, the term of this patent is extended or adjusted under 35 U.S.C. 154(b) by 498 days.

(21) Appl. No.: 16/095,908

(22) PCT Filed: Apr. 26, 2017

(86) PCT No.: PCT/IB2017/000580
§ 371 (c)(1),
(2) Date: Oct. 23, 2018

(87) PCT Pub. No.: WO2017/187265
PCT Pub. Date: Nov. 2, 2017

(65) Prior Publication Data
US 2021/0227026 A1    Jul. 22, 2021

Related U.S. Application Data

(60) Provisional application No. 62/327,907, filed on Apr. 26, 2016, provisional application No. 62/327,846, (Continued)

(51) Int. Cl.
*G06F 15/16* (2006.01)
*H04L 29/08* (2006.01)
(Continued)

(52) U.S. Cl.
CPC ...... *H04L 67/1095* (2013.01); *G06F 16/1858* (2019.01); *H04L 12/1881* (2013.01)

(58) Field of Classification Search
CPC .............. H04L 67/1095; H04L 12/188; G06F 16/1858
See application file for complete search history.

(56) References Cited

U.S. PATENT DOCUMENTS

| | | | |
|---|---|---|---|
| 5,940,838 A | * | 8/1999 | Schmuck ............ G06F 12/0862 |
| 6,209,039 B1 | | 3/2001 | Albright et al. |

(Continued)

FOREIGN PATENT DOCUMENTS

| | | |
|---|---|---|
| CN | 101079896 A | 11/2007 |
| CN | 101282448 A | 10/2008 |

(Continued)

OTHER PUBLICATIONS

Long Gong, Yonggang Wen, Zuqing Zhu, and Tony Lee, "Revenue-Driven Virtual Network Embedding Based on Global Resource Information", Globecom 2013, Next Generation Networking Symposium, pp. 2294-2299. (Year: 2013) (6 pages).

(Continued)

*Primary Examiner* — Phyllis A Book
(74) *Attorney, Agent, or Firm* — Wilmer Cutler Pickering Hale and Dorr LLP

(57) ABSTRACT

Systems and methods for providing data beacons are disclosed. In some embodiments the system can include a first node and a second node. Each node includes a read queue, a write queue and a parallel file system. Data is written from the write queue on the first node to the parallel file system on the second node and from the write queue on the second node to the parallel file system on the first node. The read queue on each node receives data from the parallel file system on the node itself.

7 Claims, 26 Drawing Sheets

Related U.S. Application Data filed on Apr. 26, 2016, provisional application No. 62/327,911, filed on Apr. 26, 2016.

(51) Int. Cl.
  *H04L 12/18* (2006.01)
  *G06F 16/18* (2019.01)

(56) References Cited

U.S. PATENT DOCUMENTS

| | | | |
|---|---|---|---|
| 6,463,465 B1 | 10/2002 | Nieuwejaar | |
| 6,735,207 B1* | 5/2004 | Prasad | H04L 45/00 |
| | | | 370/395.7 |
| 7,389,312 B2 | 6/2008 | Ohran | |
| 7,633,909 B1 | 12/2009 | Jones et al. | |
| 7,689,722 B1 | 3/2010 | Timms et al. | |
| 7,930,339 B2 | 4/2011 | Tobita et al. | |
| 8,107,363 B1 | 1/2012 | Saluja | |
| 8,611,355 B1 | 12/2013 | Sella et al. | |
| 8,966,075 B1 | 2/2015 | Chickering et al. | |
| 9,110,820 B1 | 8/2015 | Bent et al. | |
| 9,164,702 B1 | 10/2015 | Nesbit et al. | |
| 9,213,594 B2 | 12/2015 | Strasser et al. | |
| 9,277,452 B1 | 3/2016 | Aithal et al. | |
| 9,298,719 B2 | 3/2016 | Noronha et al. | |
| 9,641,612 B2 | 5/2017 | Yu | |
| 2002/0046253 A1 | 4/2002 | Uchida et al. | |
| 2003/0110214 A1 | 6/2003 | Sato | |
| 2003/0147403 A1 | 8/2003 | Border et al. | |
| 2004/0205339 A1 | 10/2004 | Medin | |
| 2005/0203892 A1* | 9/2005 | Wesley | G06F 21/6227 |
| 2005/0235352 A1 | 10/2005 | Staats et al. | |
| 2006/0195896 A1 | 8/2006 | Fulp et al. | |
| 2007/0168517 A1 | 7/2007 | Weller et al. | |
| 2008/0043742 A1* | 2/2008 | Pong | H04L 49/70 |
| | | | 370/394 |
| 2008/0117927 A1 | 5/2008 | Donhauser et al. | |
| 2008/0247386 A1 | 10/2008 | Wildfeuer | |
| 2009/0003223 A1 | 1/2009 | McCallum et al. | |
| 2009/0092043 A1 | 4/2009 | Lapuh et al. | |
| 2009/0100165 A1* | 4/2009 | Wesley, Sr. | G06F 16/245 |
| | | | 709/223 |
| 2009/0106569 A1 | 4/2009 | Roh et al. | |
| 2009/0129386 A1 | 5/2009 | Rune | |
| 2009/0217109 A1 | 8/2009 | Sekaran et al. | |
| 2009/0259798 A1 | 10/2009 | Wang et al. | |
| 2010/0325309 A1 | 12/2010 | Cicic et al. | |
| 2011/0007652 A1 | 1/2011 | Bai | |
| 2011/0231917 A1 | 9/2011 | Chaturvedi et al. | |
| 2011/0268435 A1 | 11/2011 | Mizutani et al. | |
| 2012/0005264 A1 | 1/2012 | McWhirter et al. | |
| 2012/0082057 A1 | 4/2012 | Welin et al. | |
| 2012/0105637 A1 | 5/2012 | Yousefi et al. | |
| 2012/0185559 A1* | 7/2012 | Wesley, Sr. | H04L 67/34 |
| | | | 709/217 |
| 2012/0188867 A1 | 7/2012 | Fiorone et al. | |
| 2012/0210417 A1 | 8/2012 | Shieh | |
| 2012/0270580 A1 | 10/2012 | Anisimov et al. | |
| 2013/0110787 A1 | 5/2013 | Garimella et al. | |
| 2013/0283118 A1 | 10/2013 | Rayner | |
| 2013/0286835 A1 | 10/2013 | Plamondon et al. | |
| 2013/0287037 A1 | 10/2013 | Bush et al. | |
| 2013/0318233 A1 | 11/2013 | Biswas et al. | |
| 2013/0322255 A1 | 12/2013 | Dillon | |
| 2013/0343180 A1 | 12/2013 | Kini et al. | |
| 2014/0210693 A1 | 7/2014 | Bhamidipati et al. | |
| 2014/0250066 A1 | 9/2014 | Calkowski et al. | |
| 2014/0269712 A1 | 9/2014 | Kidambi | |
| 2014/0310243 A1* | 10/2014 | McGee | G06F 16/27 |
| | | | 707/639 |
| 2014/0341023 A1 | 11/2014 | Kim et al. | |
| 2014/0359704 A1 | 12/2014 | Chen | |
| 2014/0369230 A1 | 12/2014 | Nallur | |
| 2015/0063117 A1 | 3/2015 | DiBurro et al. | |
| 2015/0063360 A1 | 3/2015 | Thakkar et al. | |
| 2015/0089582 A1 | 3/2015 | Dilley et al. | |
| 2015/0095384 A1 | 4/2015 | Antony et al. | |
| 2015/0128246 A1 | 5/2015 | Feghali et al. | |
| 2015/0271104 A1 | 9/2015 | Chikkamath et al. | |
| 2015/0281176 A1 | 10/2015 | Banfield | |
| 2015/0326588 A1 | 11/2015 | Vissamsetty et al. | |
| 2016/0006695 A1 | 1/2016 | Prodoehl et al. | |
| 2016/0077745 A1* | 3/2016 | Patel | G06F 3/0619 |
| | | | 714/704 |
| 2016/0105530 A1* | 4/2016 | Shribman | H04L 65/4084 |
| | | | 709/218 |
| 2016/0134543 A1 | 5/2016 | Zhang et al. | |
| 2016/0165463 A1 | 6/2016 | Zhang | |
| 2016/0337223 A1 | 11/2016 | Mackay | |
| 2016/0337484 A1 | 11/2016 | Tola | |
| 2017/0201556 A1* | 7/2017 | Fox | G06F 11/2007 |

FOREIGN PATENT DOCUMENTS

| | | | | | |
|---|---|---|---|---|---|
| CN | 101969414 A | | 2/2011 | | |
| CN | 102340538 A | | 2/2012 | | |
| CN | 102457539 A | | 5/2012 | | |
| CN | 103118089 A | | 5/2013 | | |
| CN | 102255794 B | * | 7/2014 | | |
| EP | 1635253 A2 | | 3/2006 | | |
| WO | WO-02/33551 A1 | | 4/2002 | | |
| WO | WO-0233551 A1 | * | 4/2002 | | G06F 11/1076 |
| WO | WO-2006/055838 A2 | | 5/2006 | | |
| WO | WO-2010/072030 A1 | | 7/2010 | | |
| WO | WO-2012100087 A2 | * | 7/2012 | | G06F 3/0631 |
| WO | WO-2013/120069 A1 | | 8/2013 | | |
| WO | WO-2015/021343 A1 | | 2/2015 | | |
| WO | WO-2016/094291 A1 | | 6/2016 | | |
| WO | WO-2016/110785 A1 | | 7/2016 | | |
| WO | WO-2016/123293 A1 | | 8/2016 | | |
| WO | WO-2016/162748 A1 | | 10/2016 | | |
| WO | WO-2016/162749 A1 | | 10/2016 | | |
| WO | WO-2016/164612 A1 | | 10/2016 | | |
| WO | WO-2016/198961 A2 | | 12/2016 | | |

OTHER PUBLICATIONS

Soroush Haeri, Qingye Ding, Zhida Li, and Ljiljana Trajkovic, "Global REsource Capacity Algorithm with Path Splitting for Virtual Network Embedding", 2016 IEEE, pp. 666-669. (Year: 2016) (4 pages).

N.M. Mosharaf Kabir Chowdhury, Muntasir Raihan Rahman, and Raouf Boutaba, "Virtual Network Embedding with Coordinated Node and Link Mapping", IEEE Communications Society Subject Matter Experts for Publication in the IEEE INFOCOM 2009, pp. 783-791. (Year: 2009) (9 pages).

"Operations and Quality of Service Telegraph Services, Global Virtual Network Service," ITU-T Standard, International Telecommunication Union, Geneva, Switzerland, No. F.16, Feb. 21, 1995 (23 pages).

Robert Russell, "Introduction to RDMA Programming," Copyright 2012, retrieved from the Internet: URL:web.archive.org/web/20140417205540/http://www.cs.unh.edu/~rdr/rdma-intro-module.ppt (76 pages).

\* cited by examiner
DATA BEACON PULSER(S) POWERED BY INFORMATION SLINGSHOT

RELATED APPLICATIONS

This application is a U.S. National Stage application under 35 U.S.C. § 371 of International Patent Application No. PCT/IB2017/000580, which claims the benefit of and priority to U.S. Provisional Application No. 62/327,907, filed on Apr. 26, 2016, U.S. Provisional Application No. 62/327,846, filed on Apr. 26, 2016, and U.S. Provisional Application No. 62/327,911, filed on Apr. 26, 2016. The entire contents of each of these applications are incorporated herein by reference.

This application also relates to the following applications, content of which are hereby incorporated by reference: International Patent Application Nos. PCT/IB16/01867, filed on Dec. 9, 2016; PCT/US15/64242, filed on Dec. 7, 2015; PCT/IB16/00110, filed on Jan. 5, 2016; PCT/US16/15278, filed on Jan. 28, 2016; PCT/IB16/00528, filed on Apr. 7, 2016; PCT/IB16/00531, filed on Apr. 7, 2016; PCT/US16/26489, filed on Apr. 7, 2016; PCT/IB16/01161, filed on Jun. 13, 2016.

BACKGROUND OF THE INVENTION

Technical Field

The present disclosure relates generally to networks, and more particularly, to the topology, configuration and operation of a data beacon pulser (DBP). A DBP offers fast, efficient, and dependable one-way casting/multi-casting of information globally. A DBP can be utilized for transmission of financial data, news feeds, seismic data, and many other applications where dependable and accurate near wire speed dissemination of rapidly changing information is time critical.

Description of the Related Art

The technology powering a data beacon pulser (DBP) is based on slingshot technology as described in U.S. Provisional Application Nos. 62/296,257 and 62/266,060 and in PCT US/16/65856 entitled "SYSTEM AND METHOD FOR INFORMATION SLINGSHOT OVER A NETWORK TAPESTRY AND GRANULARITY OF A TICK." The DBP can also utilize and integrate into the topology of a global virtual network (GVN) as described in International Patent Application No. PCT/US16/15278 entitled "SYSTEM AND METHOD FOR A GLOBAL VIRTUAL NETWORK."

Comparison of prior art for DBP technology is based on the laws of physics, specifically in relation to the speed of light and of how it relates to the transmission of information in the form of data, over various transmission mediums but specifically wire speed over fiber optic cables, via microwave or other wireless transmissions, over copper wire or other mediums. Time and the duration of time ($\Delta t$) are important measures of performance and indicators of the preeminence of one option versus others.

As a further illustration of background, the rules of physics act as a foundation for references made herein to time, latency, wire speed, and other time dependent measures. As time and distance are significant, this invention uses the following baseline for time and distance/time references. Distances herein are measured in miles under the imperial system. Measures of distance herein can be a number with or without commas, and/or decimals or expressed as an integer. One exception for distances herein which do not use the Imperial system is in the Refractive Index of Fiber Optic Cables where the distances are expressed in meters under the metric system. Unless otherwise noted, time is measured in seconds, expressed as integers, fractions and/or decimals of seconds. For example, the granularity of a tick of time can be measured either as a fraction (Every $1/20^{th}$ or $1/10^{th}$ or $1/100^{th}$) or as decimals (0.05, 0.1, 0.01) of a millisecond. Time units referenced herein may also be finer granularity than seconds, such as milliseconds (ms) and microseconds (μs), nanoseconds (ns), or other. Any granularity finer than microseconds such as nanoseconds (ns) may be important in certain practical applications of this invention but for sake of demonstration, finest practical granularity herein is μs. In computing, the most common measure of time for networking is milliseconds (ms) and for processing is microseconds (μs) or smaller.

The following table illustrates some possible values and their corresponding equivalent conversion.

TABLE 1 measures of time

| # | Description | Seconds | Milliseconds (ms) | Microseconds (μs) |
|---|---|---|---|---|
| 1 | 1/10th of a second | 0.10000 | 100 | 100,000 |
| 2 | 1/20th of a second | 0.05000 | 50 | 50,000 |
| 3 | 1/100th of a second | 0.01000 | 10 | 10,000 |
| 4 | 10 microseconds | 0.00001 | 0.010 | 10 |
| 5 | 100 microseconds | 0.00010 | 0.100 | 100 |
| 6 | 1,000 microseconds | 0.00100 | 1.000 | 1,000 |

The global internet is a mesh of networks interconnected to each other utilizing standardized network protocols and other methods to ensure end to end connectivity. The majority of the internet is based on Ethernet and specifically, the most widely used protocol is internet protocol (IP) running over Ethernet. The two main types of communication protocols on top of IP in use on the internet are Transmission Control Protocol (TCP) and User Datagram Protocol (UDP); each of TCP/IP and UDP/IP has their own benefits and drawbacks.

Devices connect to each other on the internet as one host communicating with another host. The topological relationships between hosts can be either client-server (C-S) where the clients make requests to the server which may or may not accept the request. If the request is accepted, the server can process the request and return a response back to the client. Alternatively, hosts may be defined as equal peers which communicate with each other in peer-to-peer (P2P) exchanges.

P2P and C-S typically utilize round-trip request-response pathways. TCP/IP is the most widely used protocol for P2P and C-S traffic. The speed of an internet pathway is therefore generally measured as round-trip time (RTT).

Information publishers like financial market exchanges share data from their central locations via UDP multi-cast streams or similar methods. For clients in regions far away from the source, receipt of information by a server in that client's region will receive the UDP stream of information, aggregate it on a server and make it available for clients to make REQ-RESP queries for information. Information can also be accumulated in the source region on a source server and replicated on a server in another region in CDN like operations.

Over a long distance the efficiency of TCP/IP and UDP/IP over Ethernet present certain challenges. Techniques have been developed to try to force data to flow down the best path and include OSPF (open shortest path first), BGP routing (Border Gate Protocol) and other peering related technologies.

For those who can afford the high cost, the market makes available dedicated or private lines and related technologies like MPLS (Multiprotocol Label Switching), Dark Fiber, etc., offer lines with mainly direct connectivity between points with guaranteed QoS (Quality of Service), mitigation against congestion from others, and other assurances.

Optimized financial lines and superfast hardware together strive to make the path and subsequent transit time as lean and as fast as possible. Information services such as Bloomberg which makes financial terminals available to traders also use top of the line devices to make UDP/IP and TCP/IP transport as efficient as possible.

WAN Optimization devices and software work to compress and optimize the data transmitted between the two end points of the WAN. A Global Virtual Network (GVN) optimizes peering, utilizes AI and advanced smart routing (ASR) and other technologies to improve network performance.

All of the above technologies follow the current communications methodology for transmission of data packets between origin and destination with a round-trip back to origin, with transmission times reflected as a measure of RTT or round-trip time.

Infiniband (IB) over distance is also possible with the positioning of two end-point InfiniBand enabled boxes at either end of a dark fiber pathway to realize long distance InfiniBand connectivity. Other network types may offer the same advantages as an alternative to IB over distance.

Slingshot one-way sending (U.S. Provisional Patent No. 62/266,060 referenced herein) offers certain advantages to the reliable movement of data at near wire-speed.

There are various drawbacks associated with prior art technologies. Internet Protocol (IP) over Ethernet becomes extremely inefficient over long distances and its utility decreases when there is congestion, poor routing, slower speeds, peering between different markets, or the presence of other events.

Physical limitations of a line also present challenges. Due to the law of physics, transmission of light over fiber optic lines cannot reach the speed of light in a vacuum.

TABLE 2 fiber line speed taking into account drag on optical fiber latency due to refraction

|  | miles/second in a vacuum | miles/second through fiber | fiber efficiency |
|---|---|---|---|
| Speed of light | 186,282.34 | 126,759.88 | 68.05% |

Table 2 compares the speed of light in a vacuum to the speed of light inside of the glass core of optical fiber and is based on data from http://www.m2optics.com/blog/bid/70587/Calculating-Optical-Fiber-Latency. Accordingly, there is a physical limitation to fiber efficiency which establishes a baseline for the theoretical best speed that can be achieved for light to travel through fiber, referred to as wire speed.

While the Refractive Index of fiber optic cables may vary slightly, an average is assumed as follows: Average of approx. 203 m/µs to 204 m/µs vs. speed of light of 299.792 m/µs for an average efficiency of 68.05%.

Therefore, transmission speed over fiber is 126,759.88 miles per second and is the fastest possible wire-speed which can be achieved.

For information exchange, it requires at least two round-trips (RTT). The Request-Response nature of round-trip transmission on today's internet (and corresponding RTT measurements of elapsed time) requires one host to query another host for information to be returned. Accordingly, host to host communication and drag over extended paths creates inefficiencies. But it is not that simple because the packetization of data traffic also leads to inefficiencies. As well as headers, packet size limits, multi-part payloads for files, and other issues.

For example, if using TCP/IP for the conveyance of market information the REQ-RESP RTT model wastes time from the client to the server when all that is required is a one way sending from server to client. Most financial exchanges share market information by UDP one-way streams. UPD/IP like TCP/IP must contend with congestion issues, loss, and more issues endemic to IP over Ethernet. The further away the host which requires the information is from the host which provides the information, the more prevalent the problems and the lower the efficiency of IP. Distance amplifies the problems and slows the information flow in a non-linear progression with slower times over distance.

For example, where CDN content is made available on a server very close to the client, the information from source server still needs to be replicated over distance. While a client may be able to shorten RTT to a CDN server near it (the client), the underlying data still needs to be published or otherwise replicated from a source CDN server. Therefore, this methodology can still have a detrimental effect on the time required for information conveyance and on its availability.

A private line and/or optimized financial sector line may be able to save precious time off the internet time. Such lines are typically hived off from public pathways and so spillover problems and congestion issues are abated. However, congestion issues and other problems endemic to IP can still be prevalent at times.

The UDP/IP multi-cast streams can drop packets during times of congestion or due to other IP issues. In the case of dropped packets, there is no way for the receiver to know that there was a problem and because UDP does not have the same error correction and provision to resend a lost packet that TCP/IP has, gaps of information can occur. And because the intended receiver of UDP/IP packets does not send an acknowledgement (ACK) packet, the sender does not know that the receiver did not receive it.

Using TCP/IP avoids information gaps of UDP/IP but at the cost of speed and the need to retransmit lost, corrupt or otherwise undelivered TCP/IP packets. It offers more reliability but is relatively slower and when needed most, during times of heavy activity, congestion leads to higher latency and to loss.

Getting complete visibility of rapidly changing information from multiple sources via TCP/IP and UPD/IP is possible but the inherent problems of the TCP/IP roundtrip requirement combined with the potential for unknown loss via UPD/IP presents a less than ideal situation.

Because of the interconnectedness of the world and the need for the most current information, speed of information transmission is critical but the information must be complete and accurate. For example, some securities, commodities, currencies or other financial products are concurrently traded on different markets in various regions and the change in one market will influence the activity in another market. This means that a globally traded commodity or currency or other financial instrument requires timely information from multiple markets from different regions to be aggregated in real time.

In the case of publishing of market data, exchanges are local and to get a complete picture traders need to receive data streams from multiple different exchanges, markets, and other places to obtain current information. Therefore, trading houses receive UDP multi-cast feeds from many markets into a consolidation point gathering packets and aggregating them for analysis and further dissemination.

There is a need for rapidly changing information to be made available in a timely basis to reflect market changes as they happen at all places at once. The financial market imperatives are but one high profile example of industry application of Data Beacon Pulser, however, this technology can be utilized by many other sectors, including academic, scientific, military, healthcare, and other areas.

The invention overcomes the distance issues associated with TCP/IP and UDP/IP because the underlying protocol of Slingshot powering DBP does not have the same congestion and inefficiencies problems over distance. In the case of repeat queries to fast moving and rapidly changing information, especially during times of heavy activity, UDP/IP and TCP/IP are subject to congestion events and subsequent packet loss. UDP/IP will simply drop packets without receiver nor sender being aware of this loss leading to imperfect visibility of market info. Data Beacon Pulser addresses this by offering reliability and speed superior to UDP/IP and TCP/IP over distance.

While the financial industry was used as an example of mission critical need for complete and accurate and fast transmission of data, many other industries and sectors have their own criticality around speed of delivery, and in some cases, the sheer volume of data such as in transmission of large medical diagnostic images, this volume of data can also overwhelm IP networks with congestion which leads to slowdowns.

Data Beacon Pulser can be used in financial technology networking (FinTech). It provides advantages over the current state of the art such as UDP one-way multi-casting vs DBP utilizing slingshot. DBP FinTech has important application to price discovery where accuracy, timing, and scope of information are critical to trade decision making as the basis for order execution order/confirmation. The focus on value in financial markets is an example only as a DBP may be applicable in many other industries. Those with sufficient knowledge and skill can utilize DBP for many other applications.

For example, DBP provides the following features. DBP provides one-way Beacon transfer from source to target as regular, constant flashes/pulses address the limitations of client-server (C-S) or peer-to-peer (P2P) round-trip times (RTT). The unlimited file size of DBP address issues with IP protocol packetization of files and data. The ability to send complete file sizes eliminates the need to break a file into multiple parts to be carried by a stream of multiple packets, enhancing efficiency.

The dynamic adjustment of the pulse rate of the Data Beacon Pulser (DBP) is governed by the granularity of a tick with very fine granularity down to microsecond and even nanosecond sensitivity and permits very current and fresh information to be made available. The technology for the granularity of a tick is described in U.S. Provisional Application No. 62/296,257 and PCT US/16/65856 entitled "SYSTEM AND METHOD FOR INFORMATION SLINGSHOT OVER A NETWORK TAPESTRY AND GRANULARITY OF A TICK." The receiving of information from multiple Beacons and aggregation provides more thorough information which can be analyzed in as close to real time as possible. The backbone exchange server (SRV_BBX) and sling node (SLN) and inquiry server (SRV_INC) at the source region can be programmed to capture and/or fetch information for sending by DBP in as wide or narrow a range as client preferences indicate.

In addition, the integration of DBP is an efficient use of time and resources because remote clients receive information eliminating them needing to request that information over long distance. The elimination of RTT and protocol drag improves performance. Traditional RTT via a flavor of IP uses store and forward framework where packets must be received by a device in full before being forwarded. Beacon transfer uses a cut-through method at its Slingshot core where information is received and forwarded by devices as soon as header information is received. Sending complete files via RDMA vs multipart files via packets is better because it avoids packet bloat, packetization and reassembly which require computing resources but more importantly add drag and added time.

The addition of some processing time to the data flow at the source and at the target region is compensated by a gain in wire speed efficiency of between 92% and 98% at the middle by Slingshot transport. This gain in wire speed efficiency compares with as the approximate 23% to 60% efficiency associated with native TCP/IP transport over a long distance.

TABLE 3

Ethernet IP Round-Trip-Time (RTT) versus Fiber Backbone (EBB) Latency:

| # | Locations From | To | Internet IP RTT min. / avg. (ms) | Point-to-Point Distance (miles) | FBB - one way Latency Wirespeed Milliseconds | Microseconds |
|---|---|---|---|---|---|---|
| 1 | New York | London | 65/73 | 3,465 | 27.3 | 27,335 |
| 2 | Hong Kong | London | 174/217 | 5,969 | 47.1 | 47,089 |
| 3 | New York | Singapore | 209.7/241 | 9,538 | 75.2 | 75,245 |
| 4 | New York | Los Angeles | 67/69 | 2,448 | 19.3 | 19,312 |
| 5 | New York | Tokyo | 142/172 | 6,737 | 53.1 | 53,148 |
| 6 | New York | Frankfurt | 73.4/87 | 3,858 | 30.4 | 30,435 |
| 7 | New York | Hong Kong | 191.6/253 | 8,058 | 63.6 | 63,569 |

TABLE 3-continued

Ethernet IP Round-Trip-Time (RTT) versus Fiber Backbone (EBB) Latency:

| # | Locations From | To | Internet IP RTT min. / avg. (ms) | Point-to-Point Distance (miles) | FBB - one way Latency Wirespeed Milliseconds | Microseconds |
|---|---|---|---|---|---|---|
| 8 | New York | Paris | 82/85 | 3,631 | 28.6 | 28,645 |
| 9 | New York | Sydney | 233/261 | 9,946 | 78.5 | 78,463 |
| 10 | Los Angeles | London | 131/144 | 5,447 | 43.0 | 42,971 |
| 11 | Los Angeles | Hong Kong | 168/168 | 7,245 | 57.2 | 57,155 |
| 12 | Los Angeles | Singapore | 193/215 | 8,788 | 69.3 | 69,328 |
| 13 | Los Angeles | Sydney | 163/166 | 7,497 | 59.1 | 59,143 |
| 14 | London | Sydney | 294/298 | 10,571 | 83.4 | 83,394 |
| 15 | London | Singapore | 172/188 | 6,748 | 53.2 | 53,235 |
| 16 | London | Frankfurt | 9/20 | 396 | 3.1 | 3,124 |
| 17 | Tokyo | Hong Kong | 43/55 | 1,788 | 14.1 | 14,105 |
| 18 | Tokyo | London | 207/238 | 5,936 | 46.8 | 46,800 |
| 19 | Hong Kong | Singapore | 30/31 | 1,609 | 12.7 | 12,693 |
| 20 | Point A | A + 100 miles | - ms | 100 | 0.8 | 789 |
| 21 | Point A | A + 1000 miles | - ms | 1,000 | 7.9 | 7,889 |
| 22 | Point A | A + 12000 miles | - ms | 12,000 | 94.7 | 94,667 |

Sources for Data:
https://www.sprint.net/lg/lg_start.php
http://www.verizonenterprise.com/about/network/latency/#latency
https://wondernetwork.com/pings/Hong+Kong
https://ipnetwork.bgtmo.ip.attnet/pws/network_delay.html
https://ipnetwork.bgtmo.ip.attnet/pws/global_network_avgs.html

SUMMARY OF THE DISCLOSURE

Systems and methods for providing data beacons are disclosed. In some embodiments, the system can include a first node and a second node. Each node includes a read queue, a write queue and a parallel file system. Data is written from the write queue on the first node to the parallel file system on the second node and from the write queue on the second node to the parallel file system on the first node. The read queue on each node receives data from the parallel file system on the node itself.

In some embodiments, the data is written as a carrier file comprising a header, a body, and a footer. In other embodiments, the nodes write data at a set frequency. In some embodiments, additional data is written that contains only information that has changed since the prior data was written.

In some embodiments data is written from the first node to a parallel file system on a third node.

BRIEF DESCRIPTION OF THE DRAWINGS

In order to facilitate a fuller understanding of the present disclosure, reference is now made to the accompanying drawings, in which like elements are referenced with like numerals or references. These drawings should not be construed as limiting the present disclosure, but are intended to be illustrative only.

DETAILED DESCRIPTION

Figure 1:
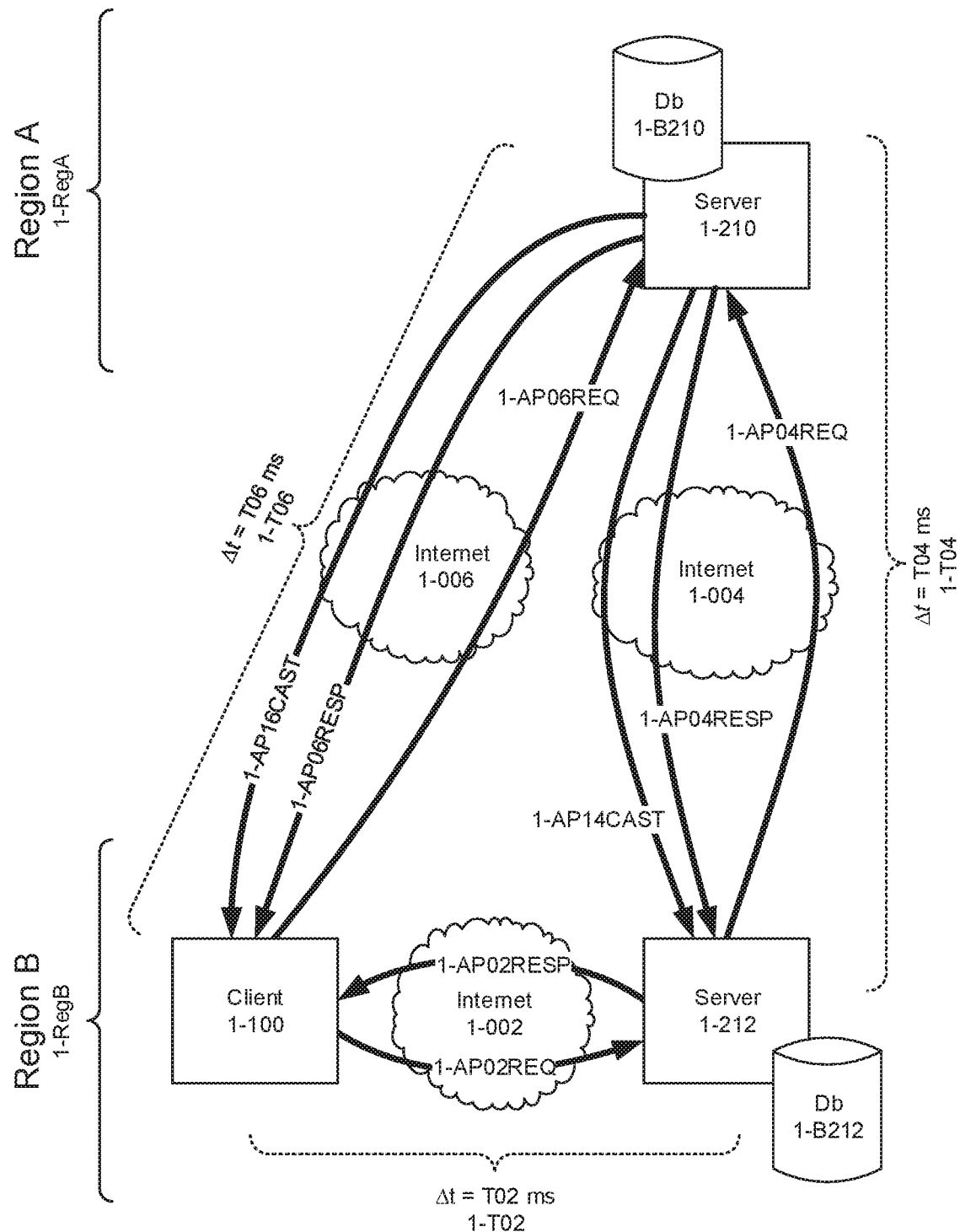
FIG. 1 illustrates a client-server (C-S) or peer-to-peer (P2P) Request-Response Framework.

In the following description, numerous specific details are set forth regarding the systems, methods and media of the disclosed subject matter and the environment in which such systems, methods and media may operate, etc., in order to provide a thorough understanding of the disclosed subject matter. It will be apparent to one skilled in the art, however, that the disclosed subject matter may be practiced without such specific details, and that certain features, which are well known in the art, are not described in detail in order to avoid complication of the disclosed subject matter. In addition, it will be understood that the examples provided below are exemplary, and that it is contemplated that there are other systems, methods, and media that are within the scope of the disclosed subject matter.

Data Beacon Pulser is a solution that facilitates realization of the benefit(s) of the speed of UDP (or faster) with the reliability of TCP. A constantly pinging Beacon utilizes the technology of network slingshot to send any-sized data from one source region to a target region. The technology for slingshot is described in U.S. Provisional Application No. 62/266,060 entitled "INFORMATION SLINGSHOT OVER A NETWORK TAPESTRY" and in PCT US/16/65856 entitled "SYSTEM AND METHOD FOR INFORMATION SLINGSHOT OVER A NETWORK TAPESTRY AND GRANULARITY OF A TICK."

A Data Beacon Pulser (DBP) super computer node (SCN) at the source is configured and programmed to capture which data to locally retrieve (via request) and/or capture (from a stream) or access directly via its memory or connected storage and it will constantly pull in the information and then use slingshot to transfer the information data to the target region.

To scale DBP two supercomputer distributed nodes are utilized. Scaling DBP is achieved by placing various nodes at distributed locations and having one Beacon send, and another receive to make data available to local devices in a target receiving region.

The way the DBP works is that the SCN in the target region (information source) can be remotely configured by the client in a remote region to gather information in which the client is interested (and related info) and make it available via the other node as soon as possible. The SCN node at the region where the client is located receives the information sent by slingshot from the SCN in the region where the information is located. This information can be aggregated by an internet facing server and that server can listen for C-S request queries made by the client with responses sent back. Information gathering/retrieval can be a constant robot at source and as narrow or as broad as client needs dictate and can be dynamically modified per the job from time to time. DBP has an on off toggle switch for each client information job to govern automated operation cycles for the relevant data sets of interest. DBP can also be utilized by financial markets or other data sources themselves to make regional access to information from source available globally.

The DBP information is sent over long distance as a file to PFS in the remote region. The DBP routing is done by writing to PFS in that region. See FIG. 12 for more detailed information regarding routing for the DBP mechanism. Transport over a large distance utilizing slingshot for sending is accomplished by the transferring of a file via RDMA to a remote PFS. This file can be of unlimited size and is transferred in parallel.

DBP also can have fixed or variable ping rates regulated by a module controlling the Granularity of a Tick. The granularity of a tick will determine how frequently to pulse send/transmit the information. The technology for the granularity of a tick is described in U.S. Provisional Application No. 62/296,257 and PCT US/16/65856 entitled "SYSTEM AND METHOD FOR INFORMATION SLINGSHOT OVER A NETWORK TAPESTRY AND GRANULARITY OF A TICK."

The SCN at various locations at the intersection point of multiple DBP from various regions can provide insight into the state of global markets or other globally relevant information. Where ripples of various beacon signals indicate information about market movement in one region, analysis by the SCN at the intersection point can provide information to trading computers to start placing trading orders in its local market to obtain a time advantage over traders in other locations.

DBP flashes may send the entire batch of information at one time or just the differential of information changed from the last DBP flash. This functionality is dependent on the size of the SCN, its settings, and other factors. Scalability is dynamic and can handle a very high load of information dependent on both the carrying capacity of the underlying dark fiber or other medium, and on the computing power of the SCN nodes and other configurations.

The financial industry examples indicated herein are only to illustrate the invention. This invention can also be utilized in many other industries and/or applications where information from one location is required to be transmitted to other locations. Furthermore, DBP is essential where complete information needs to be up to date and reliable, and available rather than bits and pieces of packetized streams of data.

FIG. 1 illustrates a client-server (C-S) or peer-to-peer (P2P) Request-Response Framework. This figure describes the information conveyance between two regions from Region A 1-RegA to Region B 1-RegB. It describes two transmission types. For each type the transmission is either via a direct link between a Server 1-210 in 1-RegA and a Client 1-100 in 1-RegB, or via an intermediary server 1-212.

Server 1-210 is the source of the information and it is in region A 1-RegA.

One transmission type is for a multi-cast one way UDP/IP transmission from Server 1-210 to Client 1-100 or from Sever 1-210 to Server 1-212. Once the information is on Server 1-212, it is available for Client 1-100 to be accessed via a request-response TCP/IP roundtrip communication via paths 1-APO2REQ and 1-APO2RESP.

Another transmission type described is for TCP/IP request-response between Server 1-210 and Client 1-100 via roundtrip paths 1-APO6REQ and 1-APO6RESP. The relay option sends information between Server 1-210 and Server 1-212 via roundtrip request-response TCP/IP via paths 1-APO4REQ and 1-APO4RESP.

There are two methodologies described herein for information conveyance from Region A 1-RegA and Region B 1-RegB describe either a UDP/IP multi-cast via 1-API14CAST to an intermediary server 1-212 or 1-API16CAST direct to client 1-100. Another method illustrated is via request-response model using TCP/IP via paths 1-APO4REQ 1-APO4RESP to Server 1-212 or paths 1-APO6REQ 1-APO6RESP to Client 1-100.

This illustration is not to scale with respect to distances and for it to make sense 1-T-02 must be smaller than both 1-T04 and 1-T06, indicating that Client 1-100 and Server 1-212 are in the same region. 1-T06 is the duration of time ($\Delta t$) for direct inquiry. The combination of 1-T02 and 1-T04 plus whatever processing time needed by Server 1-212 is the total time for an inquiry made by local relay. And the function of Server 1-212 is like that of a CDN server.

Information transmitted from Server 1-210 to Server 1-212 may be by client server request response C-S REQ-RESP or UDP casting. Information may also be transmitted from Server 1-210 to Server 1-212 by file cloning, database record replication, remote publishing of data similar to how a CDN server replicates data, or by C-S REQ-RESP efficient local C-S inquiry to serving.

Figure 2:
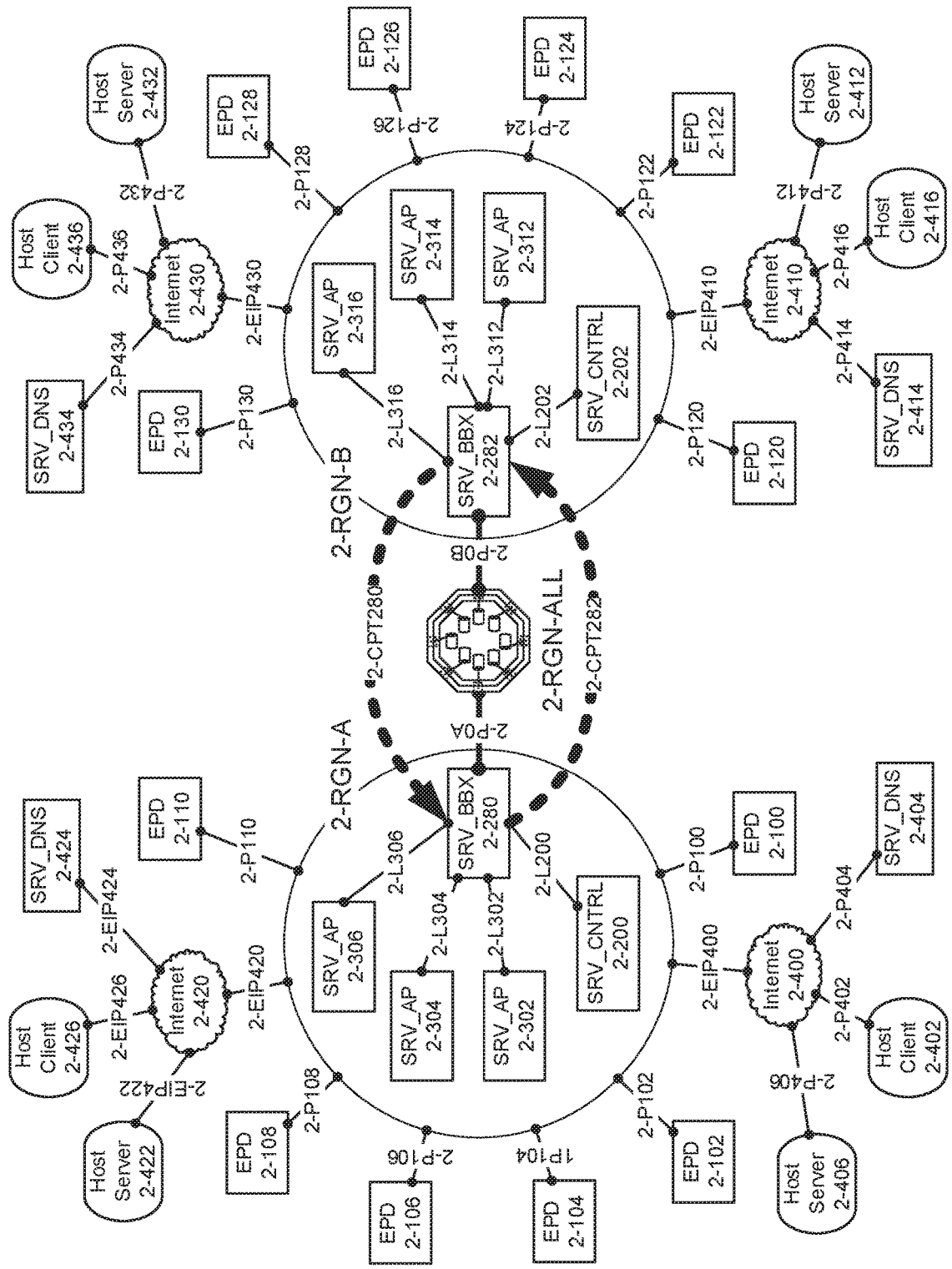
FIG. 2 illustrates a Global Virtual Network (GVN).

FIG. 2 illustrates a global virtual network (GVN).

This figure demonstrates prior art of a GVN integrated as an over-the-top (OTT) layer over the internet. Another example embodiment illustrated is a slingshot cluster in the middle 2-RGN-ALL via 2-CPT280 and 2-CPT282. FIG. 2 illustrates a global virtual network (GVN) or similar globally distributed network using hub and spoke topology with octagon routing on the backbone, with egress/ingress points (EIP) noted. The octagon shape is for illustrative purposes only—the physical construct can be any shape topology.

FIG. 2 shows the network topology of a GVN in two different regions 2-RGN-A and 2-RGN-B and how the regions are connected via paths 2-POA and 2-POB through global connectivity 2-RGN-ALL. In addition, FIG. 1 demonstrates the hub & spoke connections in each of the two regions. The multiple egress-ingress points (EIP) 2-EIP400, 2-EIP420, and 2-EIP410, 2-EIP430 in each region are added spokes to the hub and spoke model.

SRV_BBX 2-280 and SRV_BBX 2-282 are backbone exchange servers (SRV_BBX) and provide the global connectivity. A SRV_BBX may be placed as one or more load-balanced servers in a region serving as global links to other regions. Access point servers (SRV_AP) 2-302, 2-304 and 2-306 in 2-RGN-A connect to SRV_BBX 2-280—via 2-L302, 2-L304, and 2-L306, respectively. Access point servers (SRV_AP) 2-312, 2-314 and 2-316 in 2-RGN-B connect to SRV_BBX 2-282—via 2-L312, 2-L314, and 2-L316, respectively.

The central, control server (SRV_CNTRL) 2-200 serves all the devices within that region, and there may be one or more multiple master SRV_CNTRL servers. The central, control server SRV_CNTR 2-200 can connect to the backbone exchange server SRV_BBX 2-282 via 2-L200. Endpoint devices (EPD) 2-100 through 2-110 will connect with one or more multiple SRV_AP servers through one or more multiple concurrent tunnels. For example, EPD 2-100 through 2-110 can connect to the region 2-RGN-A via tunnels 2-P100 through 2-P110.

The central, control server (SRV_CNTRL) 2-202 serves all the devices within that region, and there may be one or more multiple master SRV_CNTRL servers. The central, control server SRV_CNTR 2-202 can connect to the backbone exchange server SRV_BBX 2-282 via 2-L202. Endpoint devices (EPD) 2-120 through 2-130 will connect with one or more multiple SRV_AP servers through one or more multiple concurrent tunnels. For example, EPD 2-120 through 2-130 can connect to the region 2-RGN-B via tunnels 2-P120 through 2-P130.

This figure further demonstrates multiple egress ingress points (EIP) 2-EIP420, 2-EIP400, 2-EIP430, and 2-EIP410 as added spokes to the hub and spoke model with paths to and from the open internet. This topology can offer EPD connections to an EIP in remote regions routed through the GVN. In the alternative, this topology also supports EPD connections to an EIP in the same region, to an EPD in the same region, or to an EPD in a remote region. These connections are securely optimized through the GVN. This also facilitates the reaching of an EPD from the open internet with traffic entering the EIP nearest to the source and being carried via the GVN realizing the benefits of the GVN's optimization.

In some embodiments, a host server, a host client, and a DNS server can connect to an egress ingress point via the internet. Example host servers include host servers 2-406, 2-412, 2-422, 2-432 that can connect to the internet 2-400, 2-410, 2-420, 2-430 via 2-P-406, 2-P-412, 2-EIP-422, 2-P432, respectively. Example host clients include host clients 2-402, 2-416, 2-426, 2-436 that can connect to the internet 2-400, 2-410, 2-420, 2-430 via 2-P402, 2-P416, 2-EIP426, 2-P436, respectively. Example DNS servers include SRV_DNS 2-404, 2-414, 2-424, 2-434 that can connect to the internet 2-400, 2-410, 2-420, 2-430 via 2-P404, 2-P414, 2-EIP424, and 2-P434.

RGN means Ring Global Node(s) or Regional Global Node(s). RGN_ALL means All linked Global Nodes. "Managed by MRGN" means Manager of Regional Global Nodes or Mesh of Regional Global Nodes.

Figure 3:
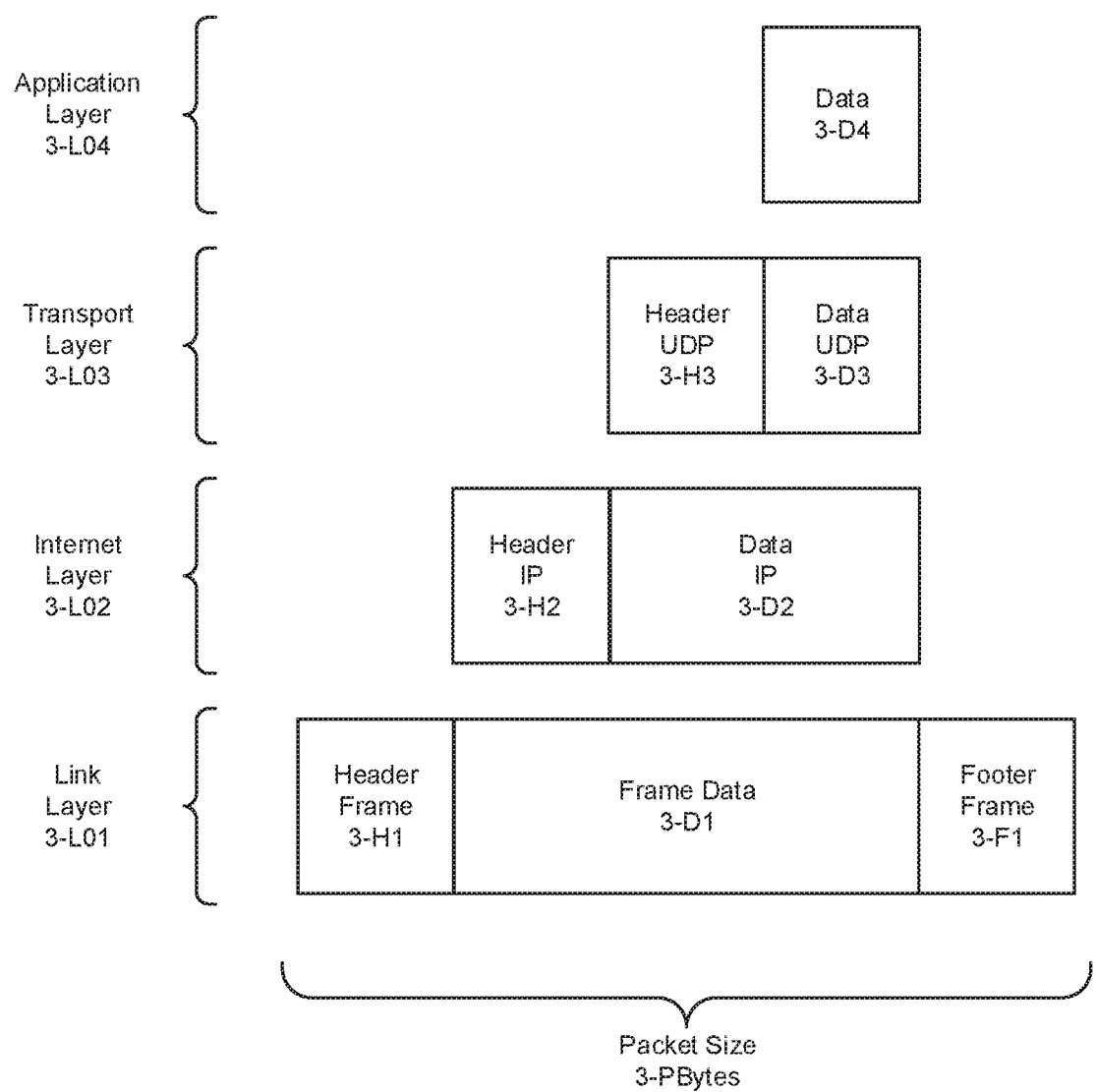
FIG. 3 illustrates the packet bloat for IP transport packets when headers are added to the data at various layers.

FIG. 3 illustrates the packet bloat for IP transport packets when headers are added to the data at various layers. This figure describes the packet bloat for IP transport. At the Application Layer 3-L04, the data payload has an initial size as indicated by Data 3-D4. The size of the packet is indicated by Packet Size 3-PBytes. At the next layer, Transport Layer 3-L03, the Packet Size 3-PBytes has the original size of the data 3-D4 which is equal to Data UDP 3-D3. It further includes bloat of Header UDP 3-H3. At the next layer, Internet Layer 3-L02 the body payload Data IP 3-D2 is a combination of 3-D3 and 3-H3. It increases 3-PBytes by Header IP 3-H2. At the Link Layer 3-L01, Frame Data 3-D1 is a combination of 3-H2 and 3-D2. It further increases 3-PBytes by Header Frame 3-H1 and Footer Frame 3-F1.

Figure 4:
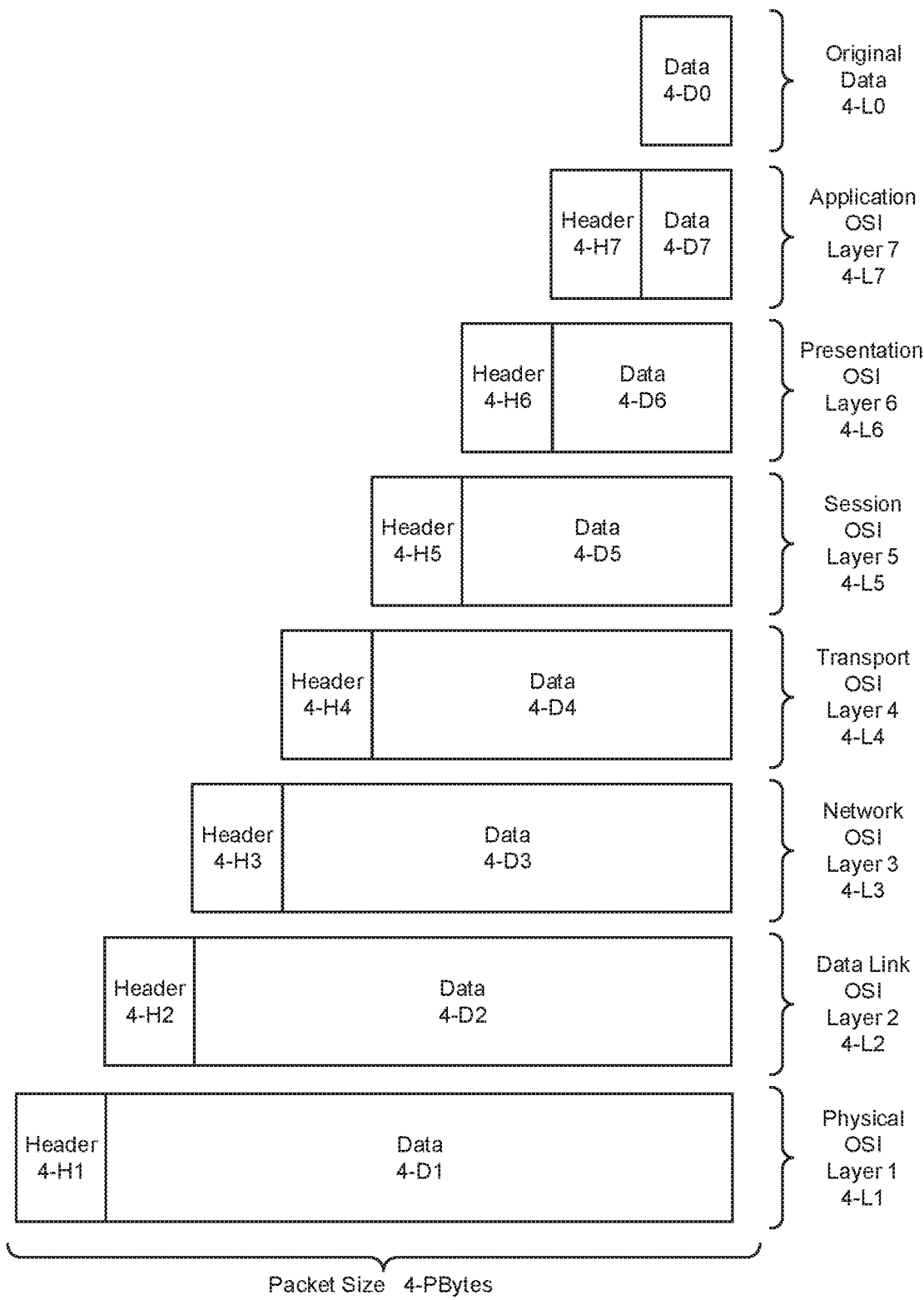
FIG. 4 illustrates the packet bloat of data and headers at each of the seven layers of the OSI model.

FIG. 4 illustrates the packet bloat of data and headers at each of the seven layers of the OSI model. The original data 4-D0 grows at each level Application OSI Layer 7 4-L7 with the addition of headers such as Header 4-H7. At each subsequent layer, down from layer 7 to layer 1, the data layer is a combination of the previous upper level's layer of Data and Header combined. The total packet bloat in an OSI model at the Physical OSI Layer 14-L1 is denoted by Packet Size 4-PBytes.

Figure 5:
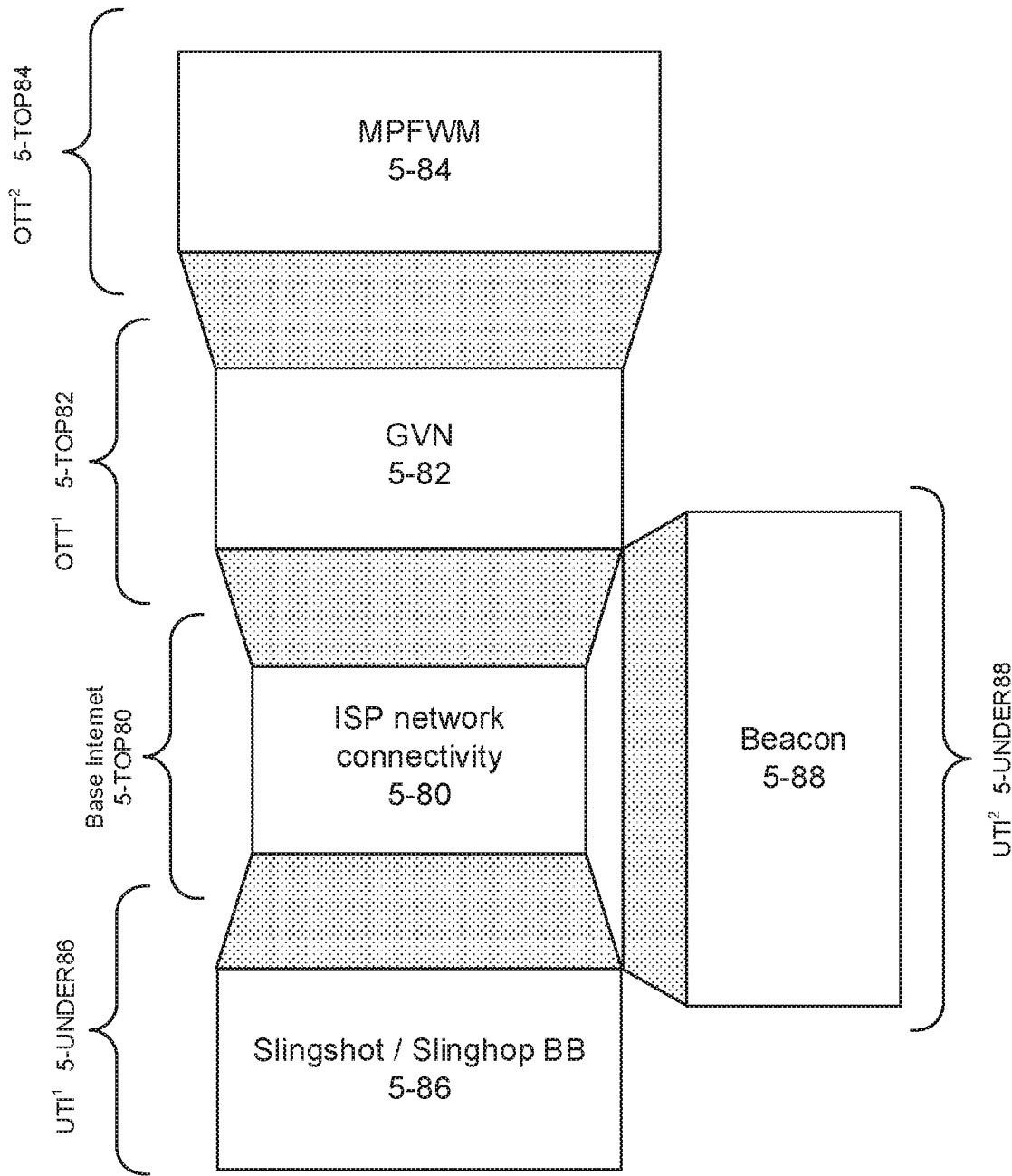
FIG. 5 illustrates layers under the Internet (UTI) mapped to Over the Top (OTT) layers.

FIG. 5 illustrates layers under the Internet (UTI) mapped to Over the Top (OTT) layers. This figure indicates where the data beacon pulser (DBP) fits into a topological hierarchy. OTT' indicates first degree over-the-top of the internet. $OTT^2$ indicates second degree over-the-top of the internet meaning that it is over-the-top of an OTT' element. UTI' indicates first degree under-the-internet layer. $UTI^2$ indicates second degree under-the-internet layer which is below the UTI' element.

GVN 5-82 is a global virtual network (GVN) which is built upon the basic plumbing of the Base Internet 5-TOP80, for example ISP connectivity 5-80. The DBP is a second degree UTI as noted by Beacon 5-88 $UTI^2$ 5-UNDER88. It utilizes the UTI' technology of slingshot 5-86.

An example of second degree OTT of MPFWM 5-84 is noted for example purposes only.

Figure 6:
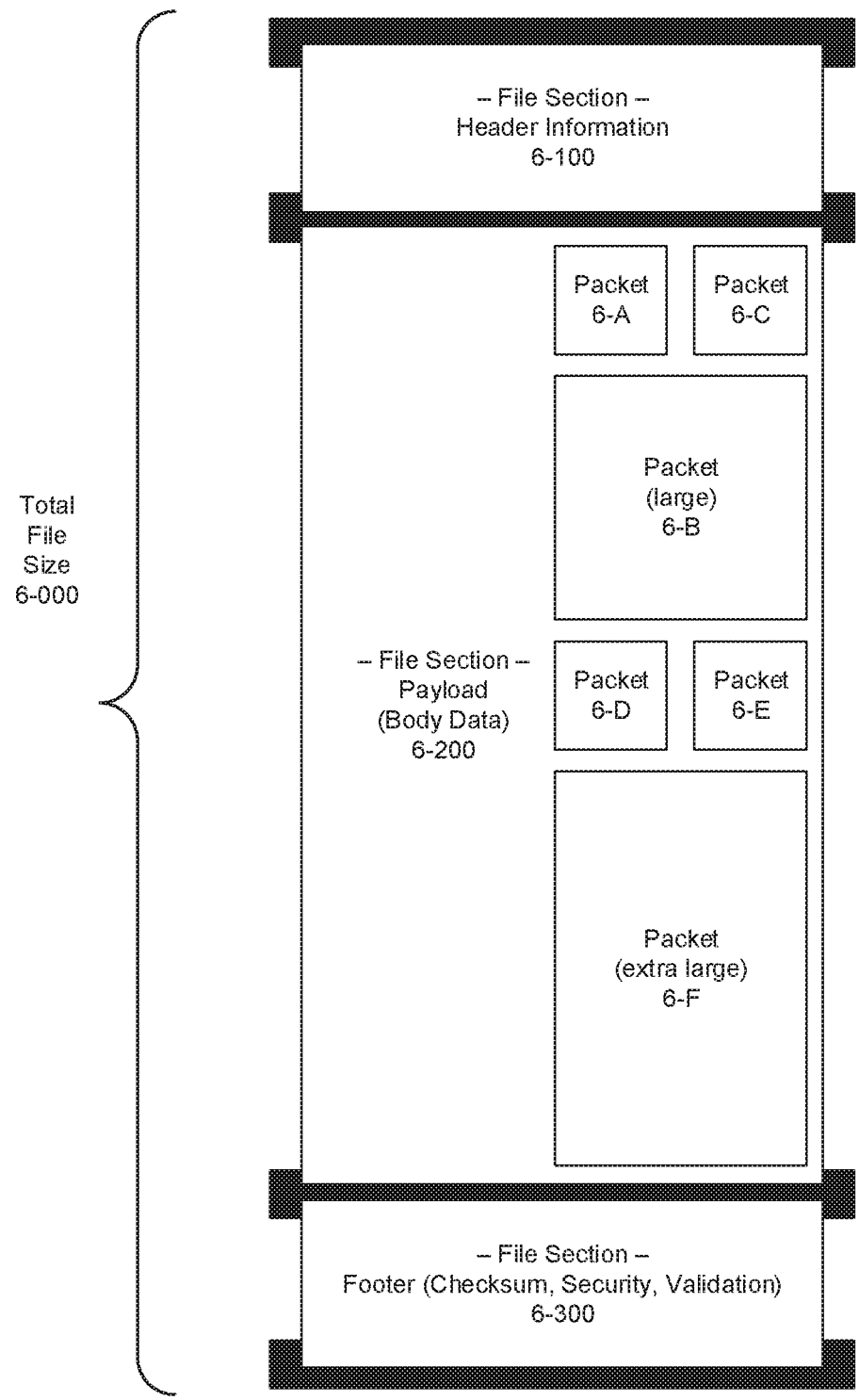
FIG. 6 illustrates Slinghop with the composition of a file as clump of packets.

FIG. 6 illustrates Slinghop with the composition of a file as clump of packets. This figure describes a carrier file sent via slingshot file consisting of a payload of packets in the Payload Body Data 6-200. This example embodiment describes a carrier file of data organized in three defined sections: Header Information 6-100, Payload containing Body Data 6-200, and a Footer 6-300. This carrier file could be stored in RAM, memory, saved to disk, or otherwise stored in another form of memory or storage.

The Header Information 6-100 can contain information about host origin, host destination, timestamp, and other information. Security information can be stored in fields in either the Header Information 6-100, the Footer Information 6-300, or both. This security information may hold references to keys to use for decryption, as well as other information.

Payload (Body Data) may be encrypted in whole or in part or sent unencrypted. Payload checksum in the footer is used to validate the integrity of the body data. EOF notation in the Footer will indicate that the file has arrived, is complete and ready to be validated/verified for accuracy and then ultimately used.

This figure illustrates various small packets such as Packets 6-A, 6-C, 6-D, or 6-E, or larger packets such as large Packet 6-B or extra-large packet 6-F. These are combined when file is created and are separated into separate packets when the file is accessed and utilized. The size, number, and composition of packets in the payload 6-200 are for example and illustrative purposes only and in practical use, the number, size, configuration of elements within the payload are different and varied. Total file size 6-000 can be the sum of header information size, payload size, and footer size.

Figure 7:
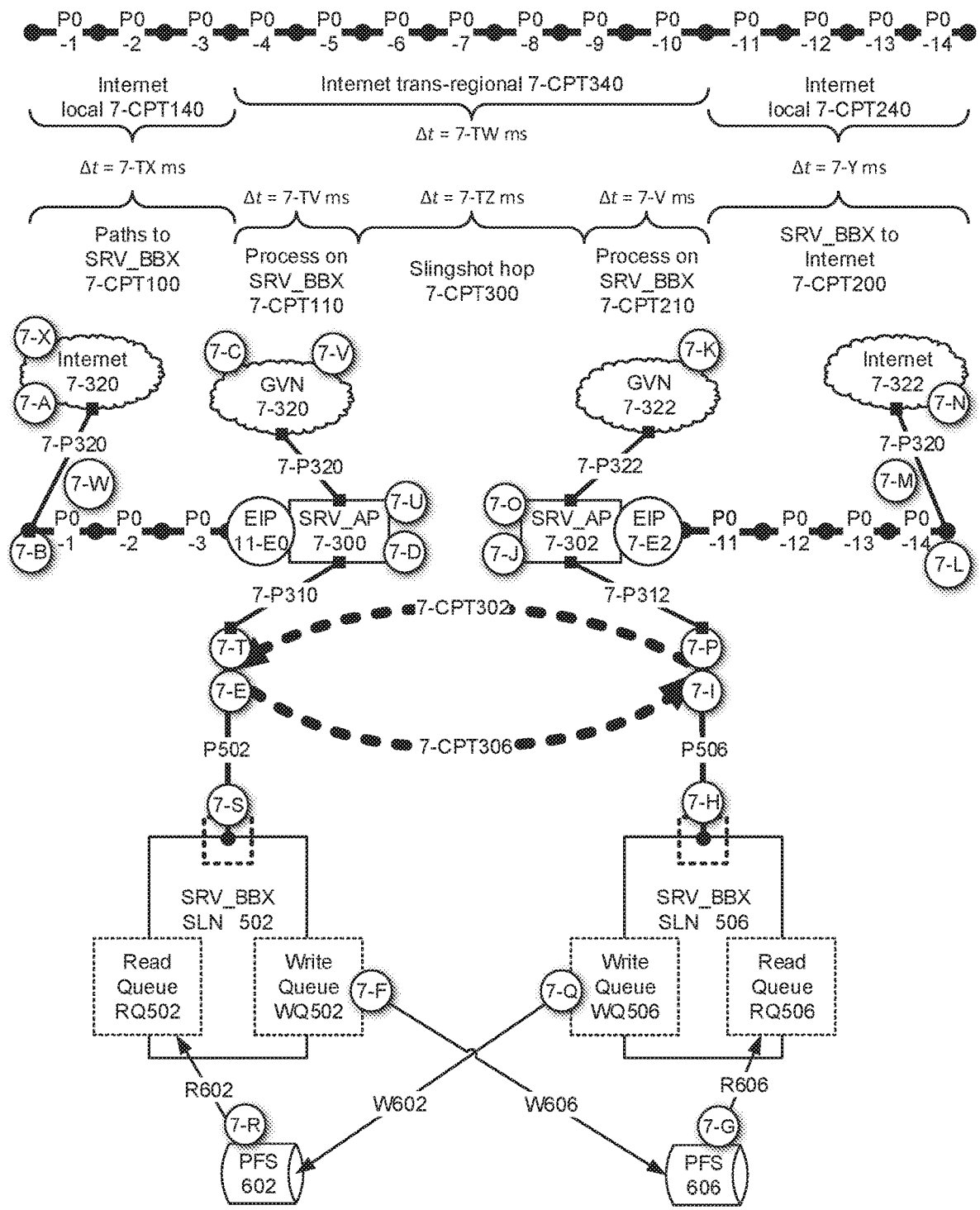
FIG. 7 illustrates an example of Slinghop information flow.

FIG. 7 illustrates an example of Slinghop information flow. This example embodiment describes how Slingshot can be utilized as a Slinghop within either a global virtual network (GVN) for long distance transport via hops 7-E to 7-I or back from 7-P to 7-T or even integrated into a regular internet path.

At the core of slingshot are backbone exchange servers (SRV_BBX) and sling nodes (SLN) 502 and 506 operating as follows. Data to be Slingshot from region where SRV_BBX SLN 502 is located to the region where SRV_BBX SLN 506 is located is transferred via a file write 7-F using remote direct memory access (RDMA) to a parallel file system (PFS) device in remote region 606. The SRV_BBX SLN 506 in the remote region periodically checks the PFS 606. If there is a new file there, it is used by the SRV_BBX SLN 506.

Traffic destined for SRV_BBX SLN 502 is sent back by SRV_BBX SLN 506 from 7-Q using RDMA to a parallel file system PFS 602 where the it will be read by SRV_BBX SLN 502.

The steps 7R and 7G are the stage when the files are read from the PFS by the Read Queues RQ502 and RQ506 respectively. These can select one of various folders. One folder may be read more frequently than another (a higher priority and or QoS), and the folder can also say which type of files where saved there, and from which source region, and even sender, or other information. Therefore, the control over and classification of files can be based on the folder name where the files were saved by the Write processes 7-F and 7-Q respectively.

Figure 8:
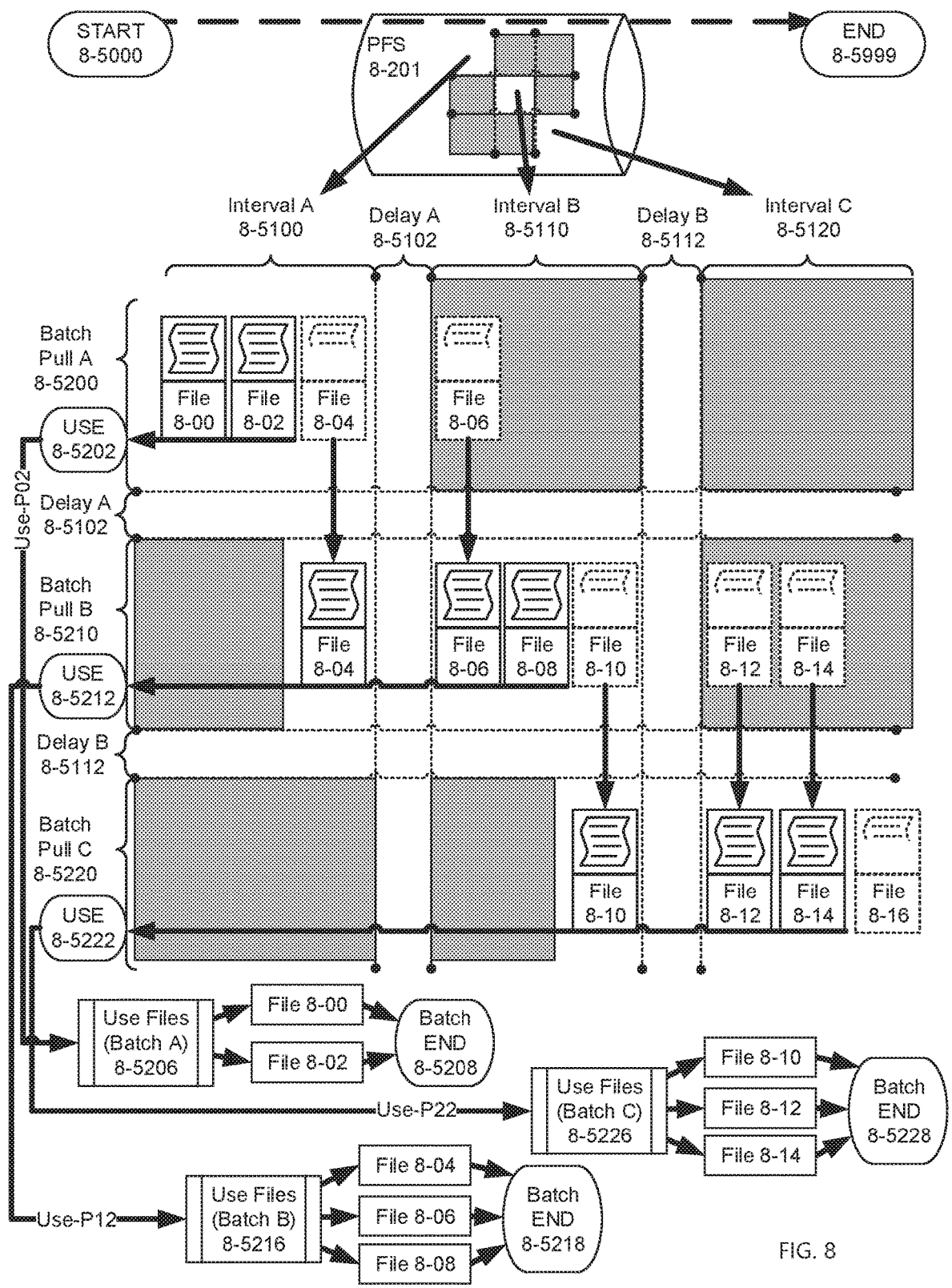
FIG. 8 illustrates the synchronization of pulling of batches of files.

FIG. 8 illustrates the synchronization of pulling of batches of files. This figure demonstrates the reading of batches of files from the PFS 8-201.

Sling batch file processing Batch Pulls A 8-5200, B 8-5210, and C 8-5220 will pull complete files in batches and then use them 8-5202/8-5206, 8-5212/8-5216, and 8-5222/8-5226 by processing the files in parallel streams for maximum efficiency and to make sure that all files are processed as quickly as possible. This also ensures that no files should wait in line behind other files.

There is a delay 8-5102 between batch pull 8-5200 (occurring during interval A 8-5100) and 8-5210 (occurring during interval B 8-5110). There is also a delay 8-5112 between 8-5210 (occurring during interval B 8-5110) and 8-5220 (occurring during interval C 8-5120). These delays allow for batches of fully received files to be read and used files to be marked as used to avoid duplicate pulls.

Files that are not fully received during one interval, can be processed in subsequent batches. In this example files 8-06, 8-10, 8-12, and 8-14, started arriving during one batch pull but were not used because they were incomplete. However, these files were read during subsequent batch and used in that next batch pull.

File 8-16 was partially received by Batch Pull C 8-5220 but as it was incomplete was ignored.

Figure 9:
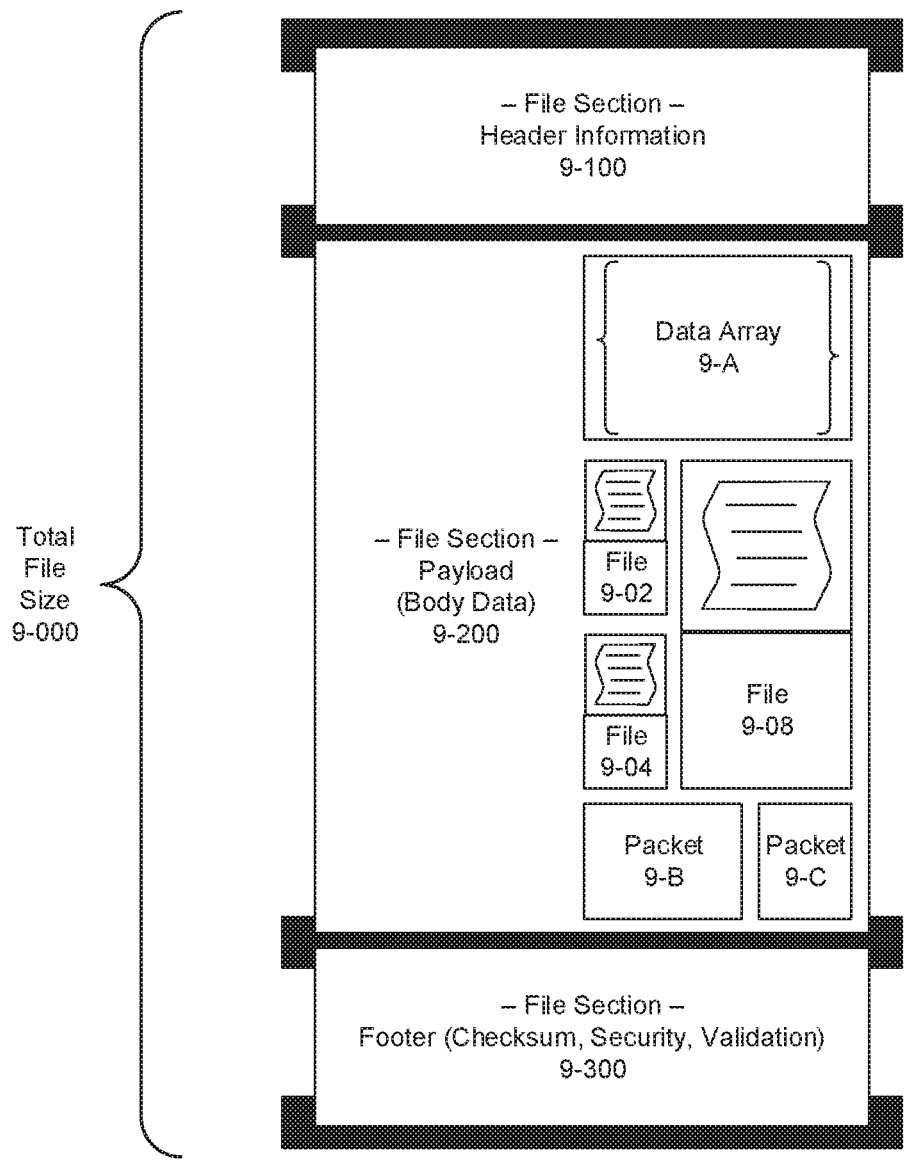
FIG. 9 illustrates a file with payload body data section consisting of various content types.

FIG. 9 illustrates a file with payload body data section consisting of various content types. This example embodiment describes a carrier file's payload body data 9-200 section which contains various kinds of content types, including a data array, files over various sizes, as well as various sized packets.

The file consists of three file sections: Header, Payload and Footer. The Header and Footer can contain previously described Header Information 9-100 and Footer Information 9-300. Total file size 9-000 can be the sum of header information size, payload size, and footer size. The Payload consists of body data 9-200 which can contain data arrays 9-A, Files 9-02 9-04 9-08, and packets 9-B 9-C. Other features can take advantage of the flexibility offered.

A significant advantage is that there can be an algorithm incorporated within the payload which gets sent as part of the payload. For example, in a financial markets context, this algorithm can contain an exit condition which is a set of instructions to take one or more prescribed actions if market conditions change—with algorithmic instructions to evaluate the direction of market change and then modify instructions accordingly. For example, to Cancel out, Reverse, Intensify, or otherwise change the instructions.

This example embodiment demonstrates only some possible uses for this multi-content payload of the carrier file, and other uses not noted but sent by DBP are possible.

Figure 10:
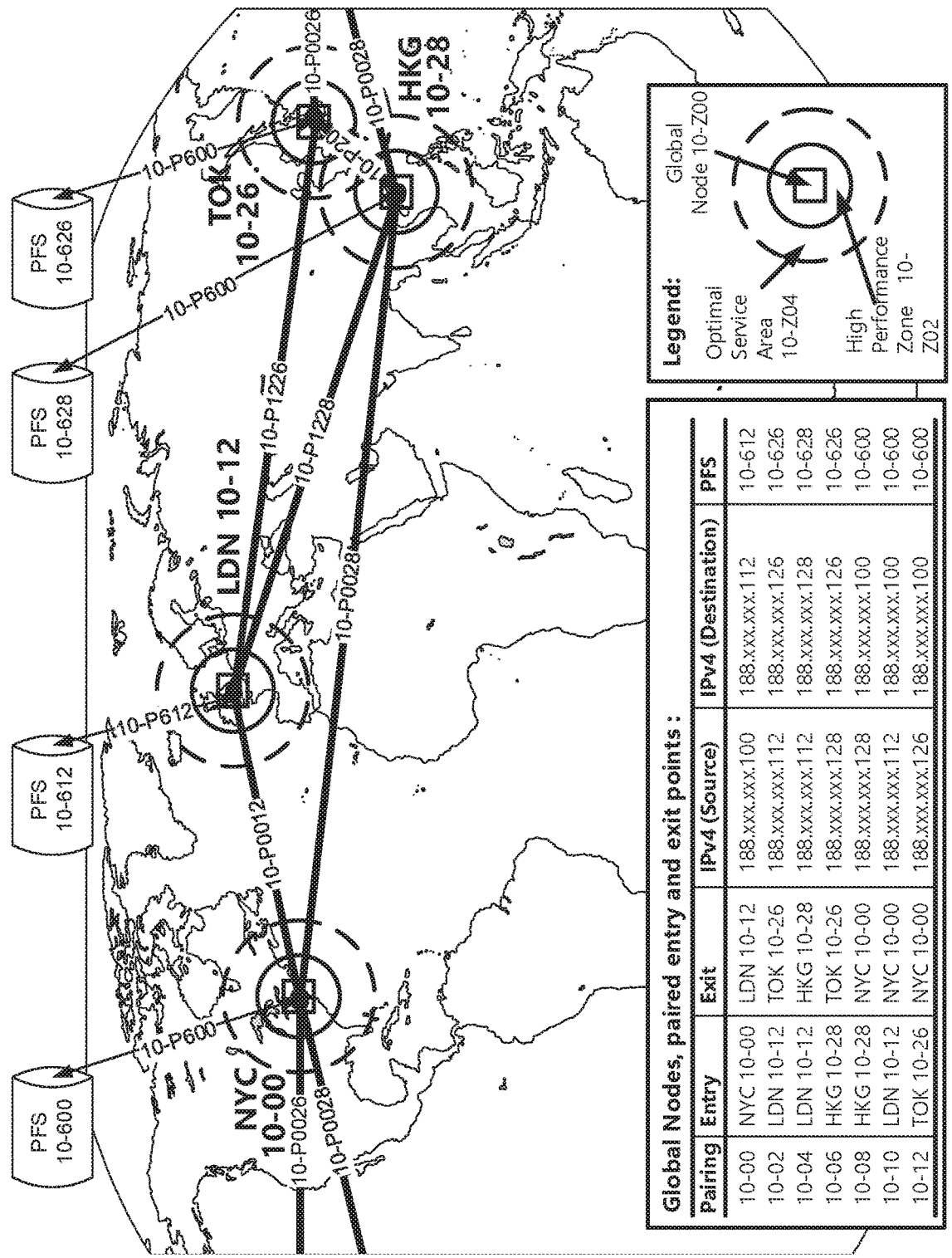
FIG. 10 illustrates Slingshot with End Points Pairs (EPP) Topology overlaid on map of northern hemisphere.

FIG. 10 illustrates Slingshot with End Points Pairs (EPP) Topology overlaid on map of northern hemisphere. This figure demonstrates the geographic placement of a few global nodes of a GVN, and example connectivity paths. For illustrative purposes, the lines are drawn as straight lines between points.

Due to political/administrative boundaries, cities limits, zoning, geographic features such as bodies of water, various elevation changes, and other reasons, the actual routes of pipes are rarely ever straight or direct. However, the additional distance caused by path deviations from the potentially most direct route do not add enough distance to have a significantly adverse effect of added latency. It is assumed that the lines follow the most optimal path possible, and enhancements herein focus on efficiency of utilization of these lines.

For illustrative purposes, segments can be described as city or location pairs and for Slinghop purposes, the origin end-point of the Slinghop is represented by an IP Address or hostname or other label of a server or gateway device there, with segment transiting over the Slinghop segment to IP address or hostname or other label of the server or gateway device at the target end-point city/location. Transit from one location to the other is as simple as from origin IP address to target IP address and for the return path the IP addresses are in reciprocal order. This single Slinghop segment replaces many other IP segments over the internet and is optimized by Slingshot.

PFS naming can be based on last octet or last 2 octets of an IP address or other such label such as hostname, or other label naming scheme. PFS naming can also include city code, region, IP Address, noted world nodes, and more factors. IP address pairs denoting bridgeheads at either end of a segment. For example, from 188.xxx.xxx.100 to 188.xxx.xxx.112 means that Slingshot will write to PFS 10-612, or in other terms, traffic from New York City NYC 10-00 will be directly written to a PFS 10-612 in London LDN 10-12. And for return traffic from 188.xxx.xxx.112 to 188.xxx.xxx.100 means that Slingshot will write to PFS 10-600, or in other terms, traffic from London LDN 10-12 will be directly written to PFS 10-600 in New York NYC 10-00.

Like airline routes for roundtrips, the combination of two one-way segments constitute a Slinghop transparent roundtrip integration nested into an existing IP pathway. And to further this analogy, sling-routed traffic can be one way and or to various routes concurrently.

In the event of failure of one link such as 10-P1226 from London LDN 10-12 to Tokyo TOK 10-26, Slingroute can either save data to HKG 10-28 and then save this data to TOK 10-26 or it can relay through HKG 10-28 for save to TOK 10-26. Other such re-directs and re-routes can be utilized by Slingroute to get data to destination if the most direct path is compromised or otherwise unavailable.

Figure 11:
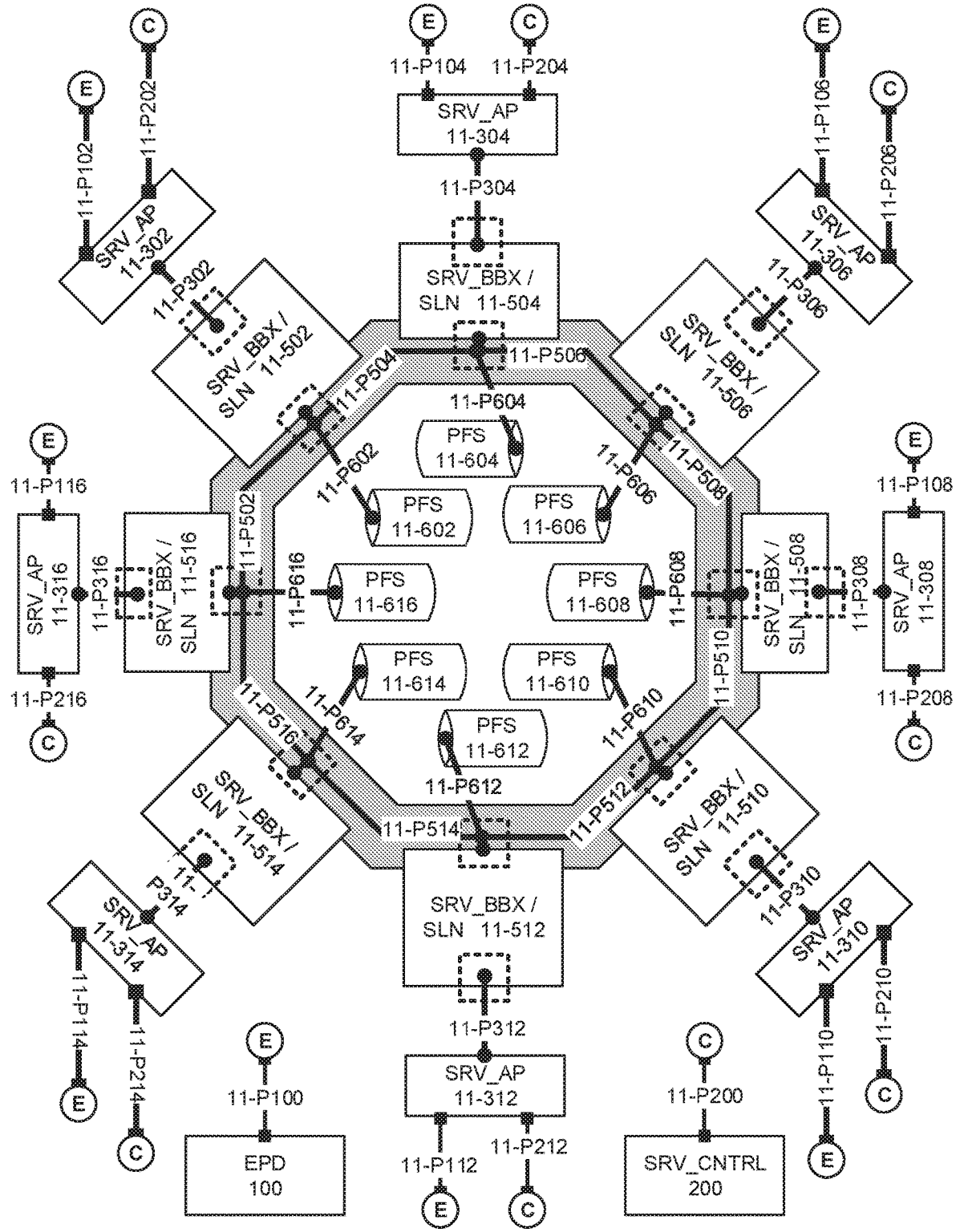
FIG. 11 illustrates Sling-Routing with a ring of global nodes.

FIG. 11 illustrates Slingrouting with a ring of global nodes. This figure demonstrates the Slinghop internals and operations with respect to topological structure. This figure is not to scale nor is the octagonal shape of any significance other than being able to organize information for human visual understanding. It demonstrates how backbone exchange servers (SRV_BBX) and sling nodes (SLN) 11-502 through 11-516 can access and write to various PFS devices such as PFS 11-602 through PFS 11-616. They are all connected via an internal backbone of various joined segments 11-P502 through 11-P516.

As an example, it shows how the Slinghop can integrate with a GVN and some of its devices such as an access point server (SRV_AP) 11-302, an end-point device (EPD) 100, and a central control server (SRV_CNTRL) 200. The circles with an E represent an egress-ingress point (EIP) to an EPD. The circles with a C represent an EIP to an SRV_CNTRL. Similar configurations can be available for other access point servers SRV_AP 11-304 through 11-316, other backbone exchange servers and sling nodes SRV_BBX/SLN 11-504 through 11-516, and other paths or links 11-P102 through 11-P116, 11-P202 through 11-P216.

The octagonal shape is not of material significance and is presented for illustrative purposes only. The actual shape may or may not be in a ring shape, or will take on other shape(s).

Figure 12:
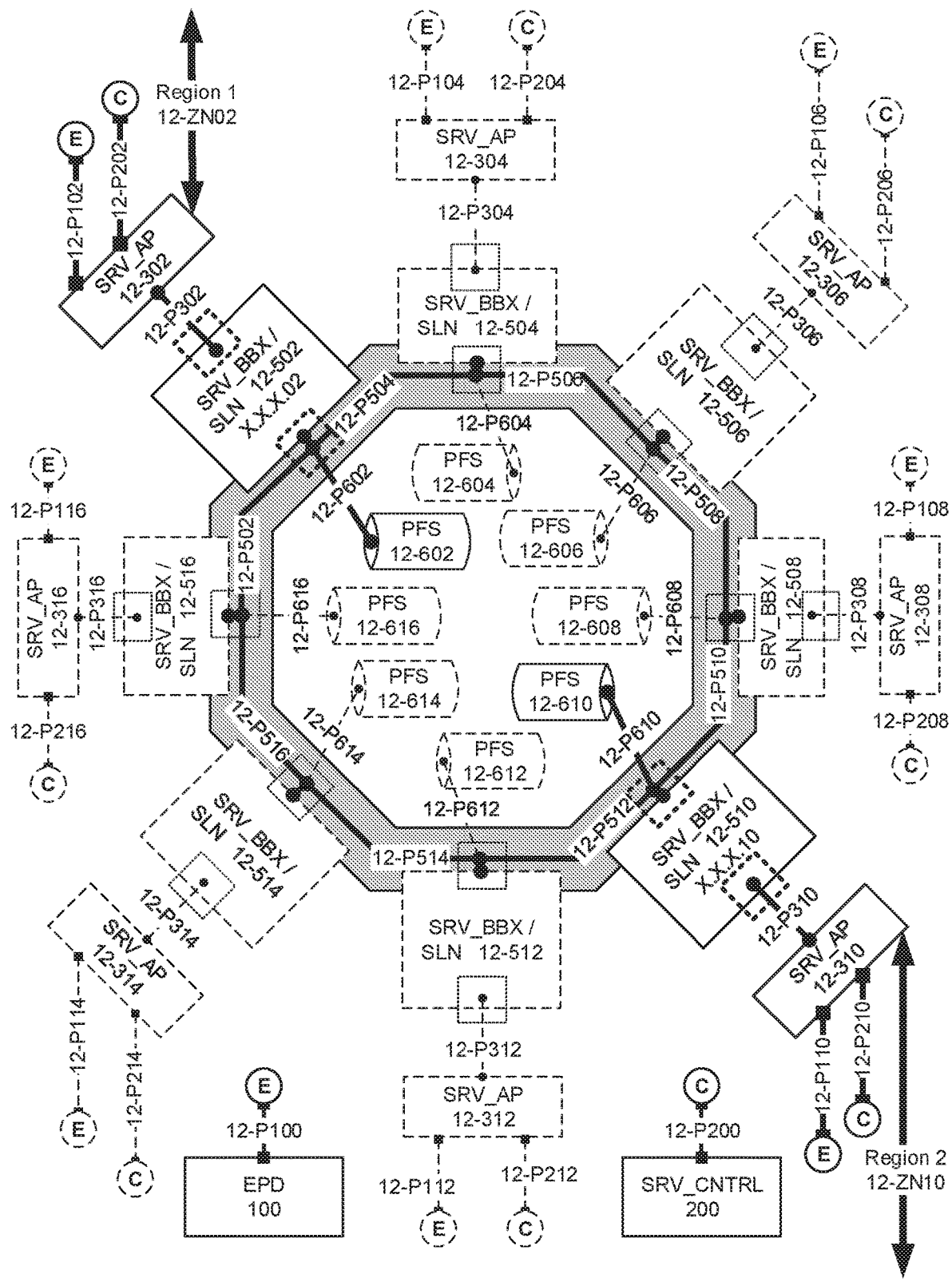
FIG. 12 illustrates Sling-Routing with Targeted Write to PFS to route traffic

FIG. 12 illustrates Slingrouting with Targeted Write to PFS to route traffic. FIG. 12 is based on FIG. 11 with some exceptions. Differences between these example embodiments are that most of the bridgehead node points are faded. This is to highlight interaction between two bridgehead node points denoting Slinghop connectivity from Region 2 12-ZN02 to Region 10 12-ZN10 via SRV_BBX/SLN 12-502 to write via RDMA directly to PFS 12-610 with SLN/SRV_BBX 12-510 reading the carrier file and using it in Region 10 12-ZN10. Reciprocal traffic in the other direction from Region 10 12-ZN10 to Region 2 12-ZN02 is written via RDMA by SRV_BBX/SLN 12-510 to PFS 12-602. The carrier file is read by SRV_BBX/SLN 12-502 to be used there.

These bridgeheads are bolded to highlight their place and focus. IP addresses are noted for illustrative purposes X.X.X.02 at 12-502 and X.X.X.10 at 12-510 as either end. Slinghop is therefore from Region 2 12-ZN02 to Region 10 12-ZN10 by IP order of X.X.X.02 to X.X.X.10, and back from Region 10 12-ZN10 to Region 2 12-ZN02 via IP order of X.X.X.10 to X.X.X.02.

In practical use, all connected nodes can concurrently connect with PFS devices in all other regions and locations. This figure focuses on the example embodiment of one two-way Slingroute.

Figure 13:
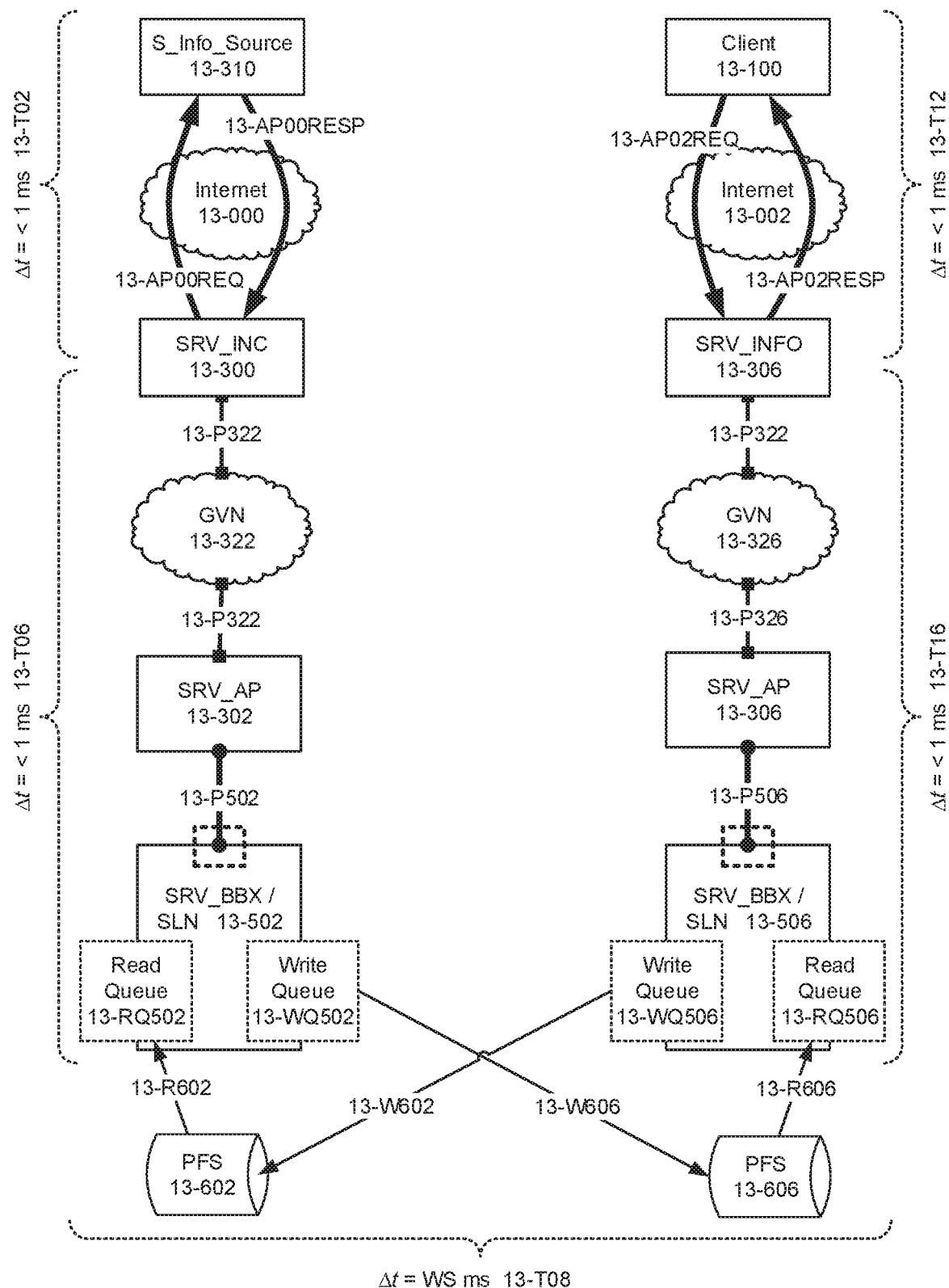
FIG. 13 illustrates one example of the Beacon mechanism framework and flow.

FIG. 13 illustrates one example of the Data Beacon Pulser (DBP) mechanism framework and flow. This example demonstrates how DBP can utilize Slingshot to make information from a source region 13-310 available to a client 13-100 in another region in as timely a fashion as possible. As both info source server (S_Info_Source) 13-310 and Client 13-100 are connected via the internet, two servers in close proximity to each negotiate with them using standard internet protocols such as TCP/IP and UDP/IP.

The server making inquiries or receiving and incorporating multi-cast streams (SRV_INC 13-300) can connect through a GVN 13-322 to an access point server SRV_AP 13-302, or it can also connect directly with the backbone exchange server (SRV_BBX) and sling node (SLN) 13-502. The DBP uses slingshot to write a carrier data file from write queue 13-WQ502 via path 13-W606 using RDMA to parallel file system device (PFS) 13-606. The read queue 13-RQ506 on SRV_BBX SLN 13-506 fetches the file from PFS 13-606. This file can be conveyed via SRV_AP 13-306 to GVN 13-326 or directly to info server (SRV_INFO) 13-306. SRV_INFO 13-306 acts as a host of the information for client 13-100 to access via 13-APO2REQ and 13-APO2RESP. Similarly, data traveling in the reverse direction can be written from write queue 13-WQ506 to PFS 13-602 via path 13-W602 and will be read by read queue 13-RQ502.

This example embodiment also demonstrates important measures of the duration of time. For example, the duration of time Δt 13-T08 denotes the transport phase of slingshot and is as close to wire speed as possible. At 13-T02 measures the duration of time for SRV_INC 13-300 to either receive the cast or to fetch info from 13-310. At 13-T06 measures the duration of time for information to be conveyed from SRV_INC 13-300 to SRV_BBX SLN 13-502 for conveyance by slingshot. Δt 13-T16 measures the duration of time for the file to be read in the remote region and used. Δt 13-T12 measures the duration of time for the conveyance of the file to the SRV_INFO 13-306 for access by the client.

The total time for DBP is measured by the following equation:

$$\text{Total time} = \Delta t 13\text{-}T02 + \Delta t 13\text{-}T06 + \Delta t 13\text{-}T08 + \Delta t 13\text{-}T16 + \Delta t 13\text{-}T12$$

There is a certain amount of time delay added by the DBP framework. This is overcome by the significant efficiency gain by reducing the duration of time Δt 13-T08.

Figure 14:
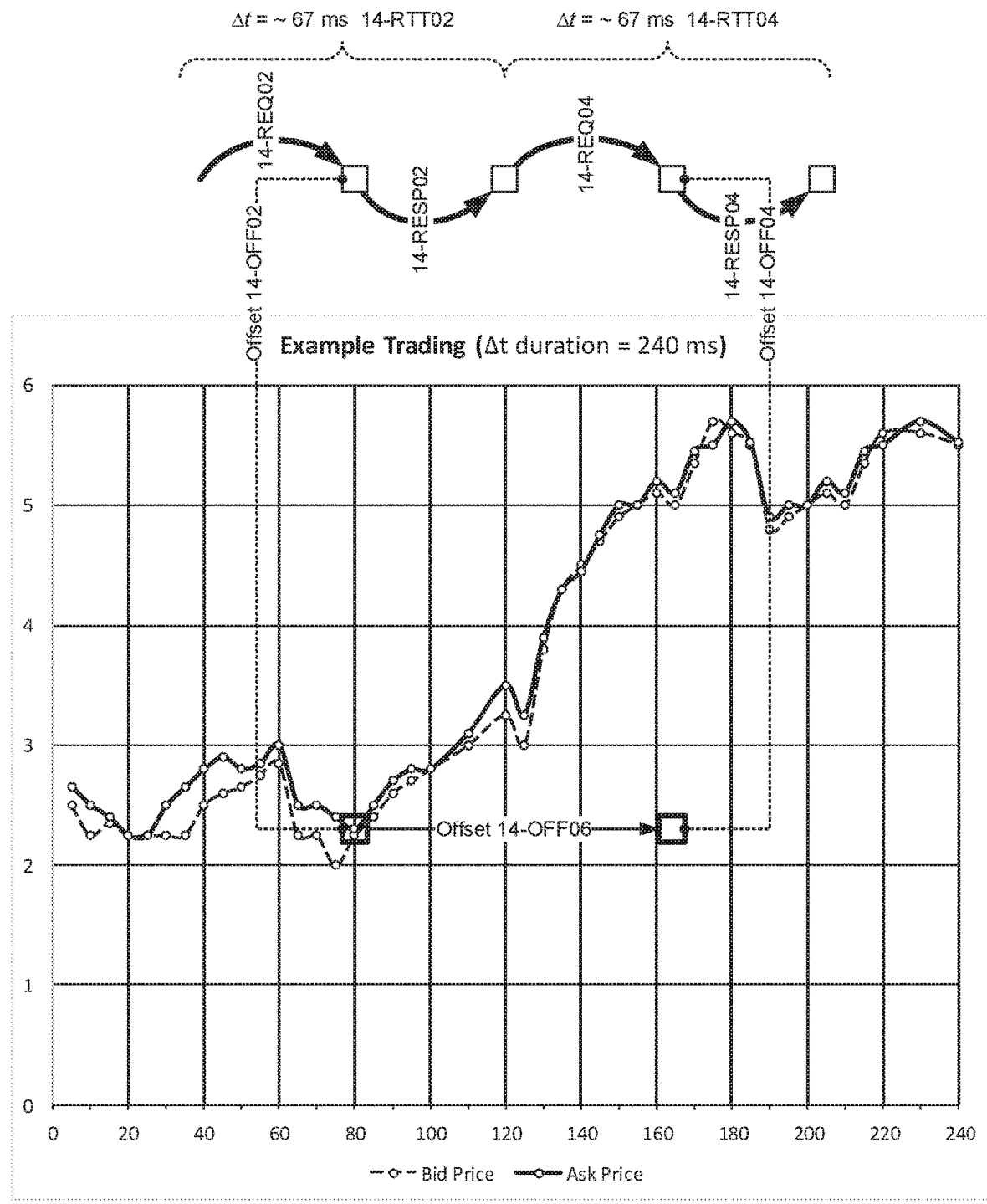
FIG. 14 illustrates the round-trip-time for transmitting market information.

FIG. 14 illustrates the round-trip-time for transmitting market information. This example embodiment demonstrates an example of security or commodity or other market information and trade execution using a combination of UDP/IP multi-casting and TCP/IP RTT. It illustrates the duration of time for information to reach a client and for that client to send a trade instruction based on the information. The 67 ms noted in 14-RTT02 and 14-RTT04 is the current best round-trip-time (RTT) offered by providers of financial lines between New York and London.

The Offset 14-OFF06 further illustrates the absolute minimum response time from information dissemination to trade order presentation.

Figure 15:
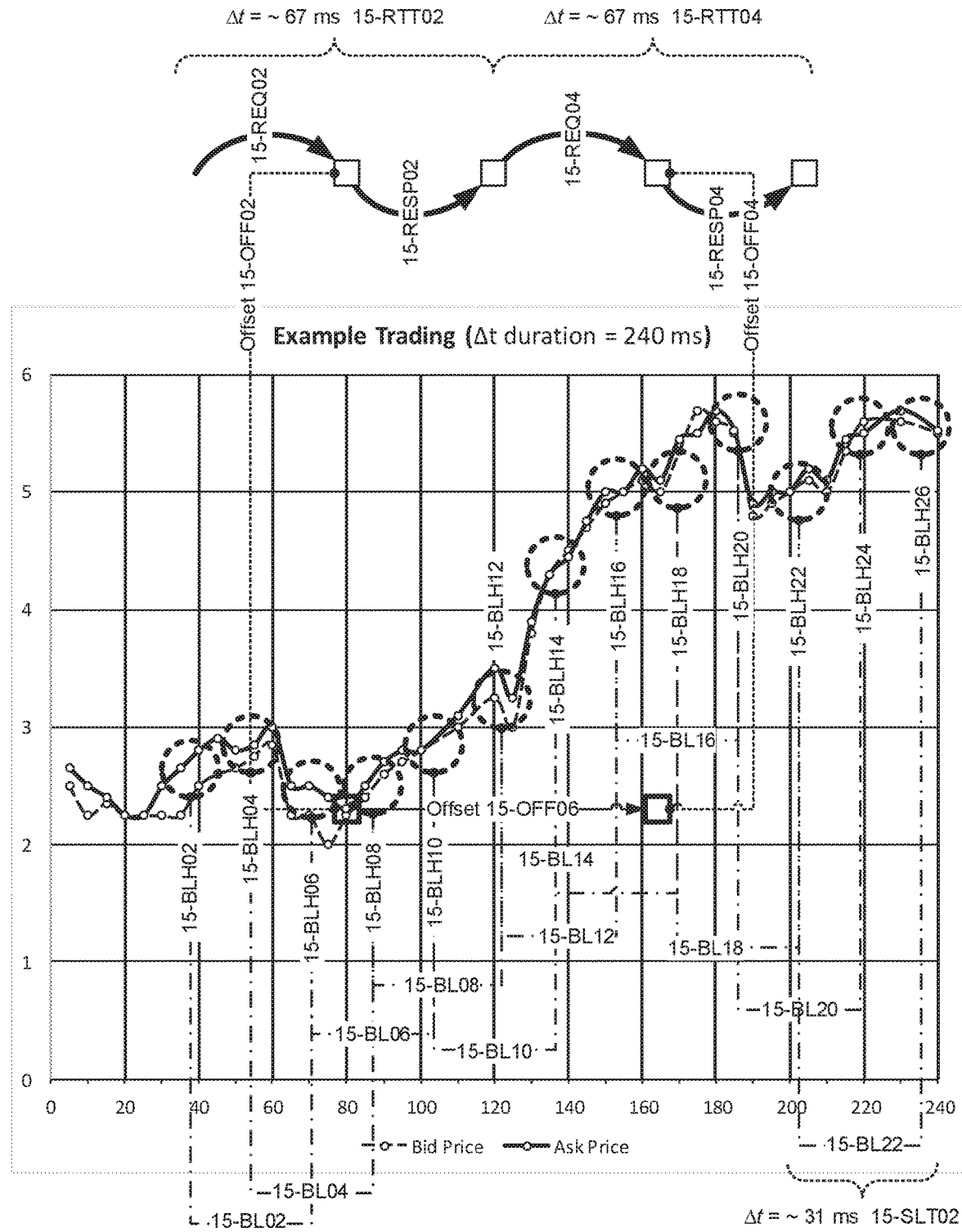
FIG. 15 illustrates the timing for transmitting market information with data beacon pulser and slingshot.

FIG. 15 illustrates the timing for transmitting market information with data beacon pulser and slingshot. This example embodiment demonstrates the transmission of market information via data beacon pulser (DBP) and trade execution using powered by slingshot.

The native advantages of slingshot reduce required time for one-way transport with high reliability and data rich conveyance. Consequently, information is available faster than via traditional IP based methods. Trade execution request is slingshot back to market very rapidly.

Because DBP constantly sends information as pulses of information, there are significantly more information sources and durations of time from info receipt to trade order presentation are shorter.

15-BL02, 15-BL04, 15-BL06 are examples of compressed reaction times enabling faster trade execution. As compared to offset 15-OFF06 for traditional trade info receipt through to RTT for trade order and RTT for trade confirmation, the advantages of DBP and slingshot are obvious and evident.

Figure 16:
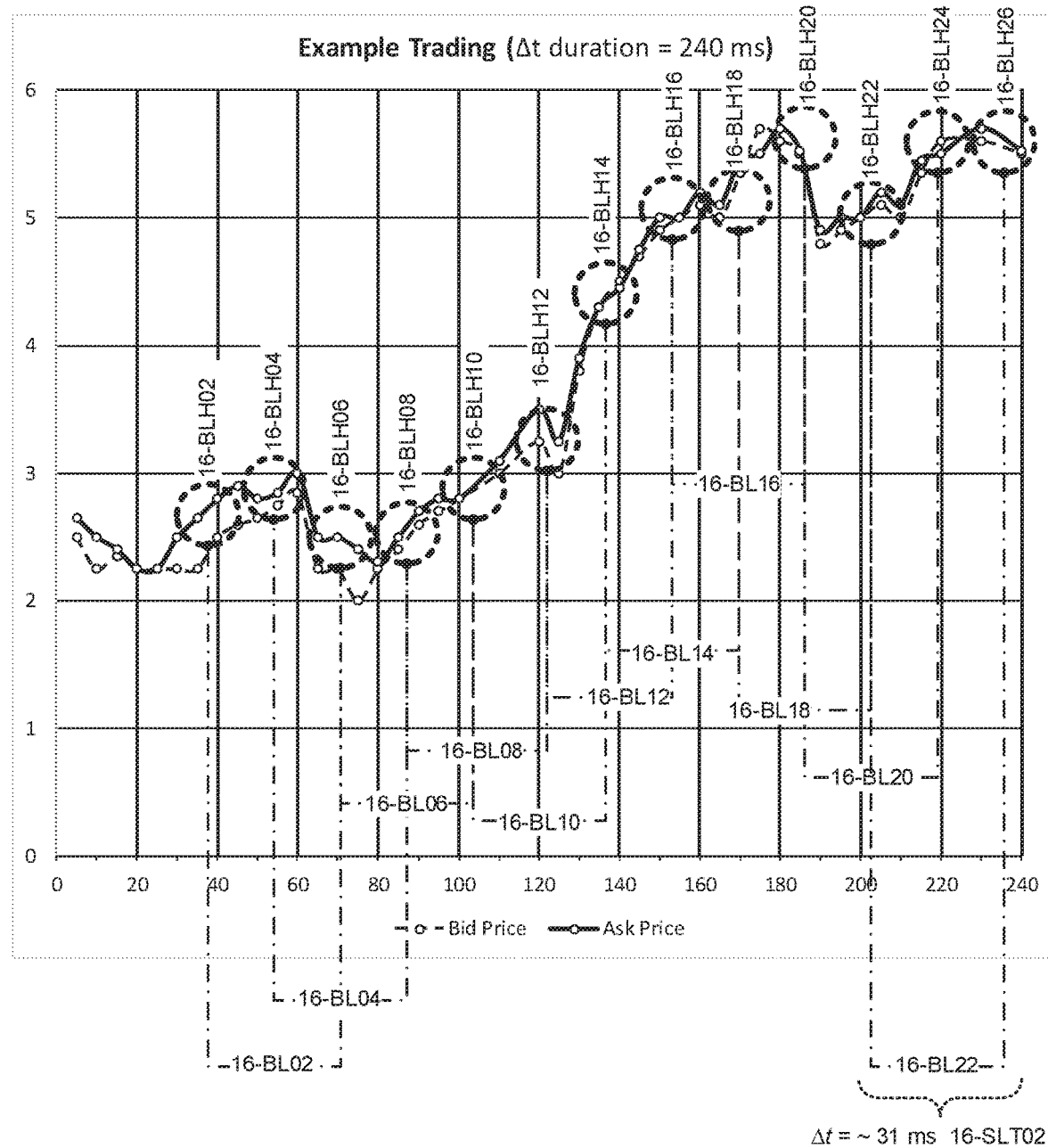
FIG. 16 illustrates the timing for transmitting market information with data beacon pulser.

FIG. 16 illustrates the timing for transmitting market information with data beacon pulser. This example embodiment demonstrates the data beacon pulser (DBP) by itself. It is an example only illustrating security or commodity or other market information and trade execution utilizing beacon and slingshot one way sending.

The pulses are received regularly. In this example, they are spaced apart at large intervals—this was done to simplify the presentation. In real world application, DBP can send pulses multiple times per ms. A key point is that information is as current as near wire speed between source and querying target. And trade presentation hits the market also at as quick to wire speed as possible.

Figure 17:
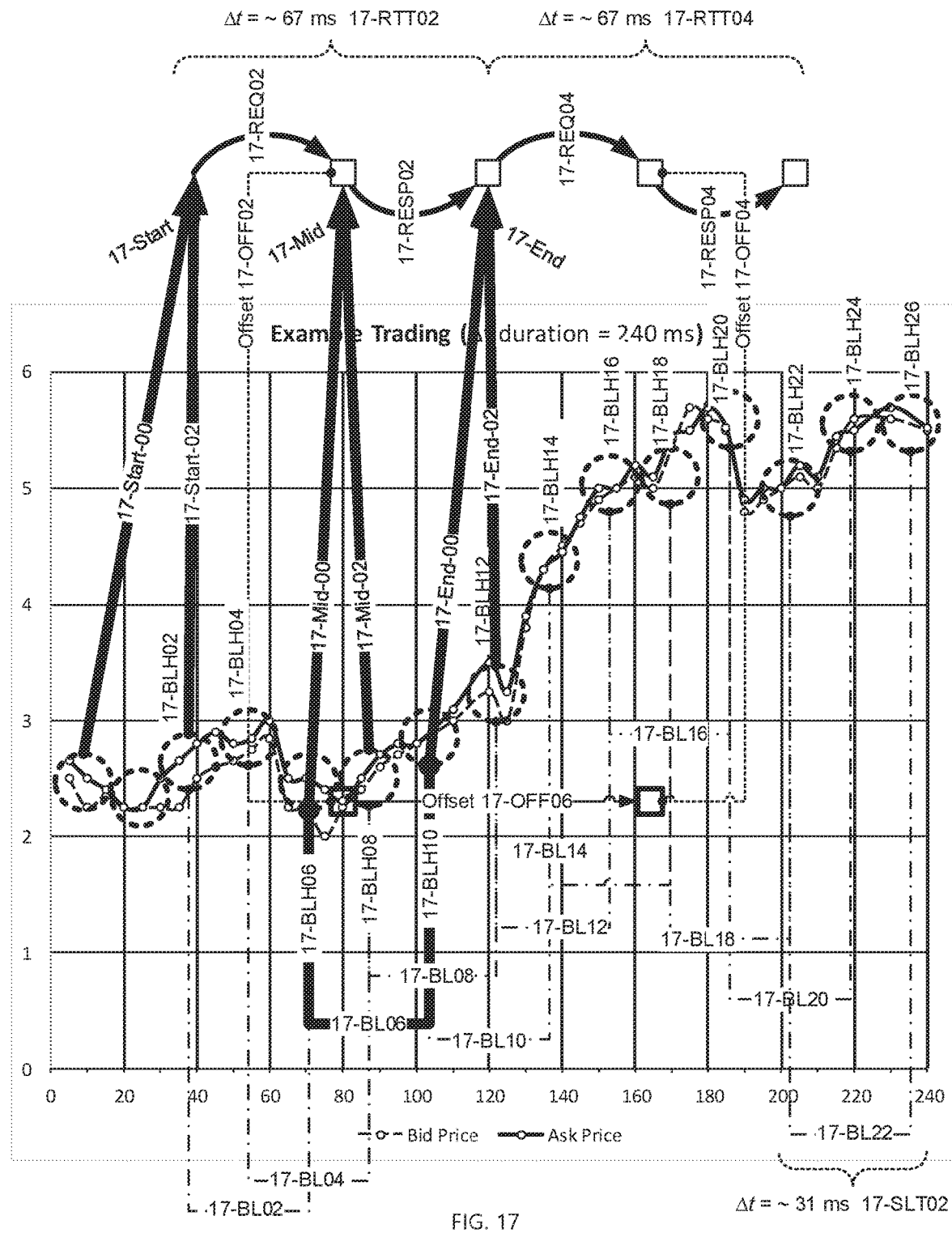
FIG. 17 illustrates the round-trip-time for transmitting market information and the timing for data beacon pulser.

FIG. 17 illustrates the round-trip-time for transmitting market information and the timing for data beacon pulser. This example embodiment compares traditional IP based trade information multi-casting and RTT TCP/IP trade execution requests against data beacon pulser (DBP). It is aligned with a start based on pricing at a certain moment of time.

This example compares RTT vs Beacon for information and slingshot for trade execution/slingshot for trade confirmation. 17-Start relates to the delivery of market information by Beacon. 17-Mid is the time for the trade execution order to be placed. 17-End is the time for the trade confirmation to be received.

In short, this figure demonstrates that the trade order by DBP is presented to market well in advance of an equivalent trade order by traditional IP methods.

Figure 18:
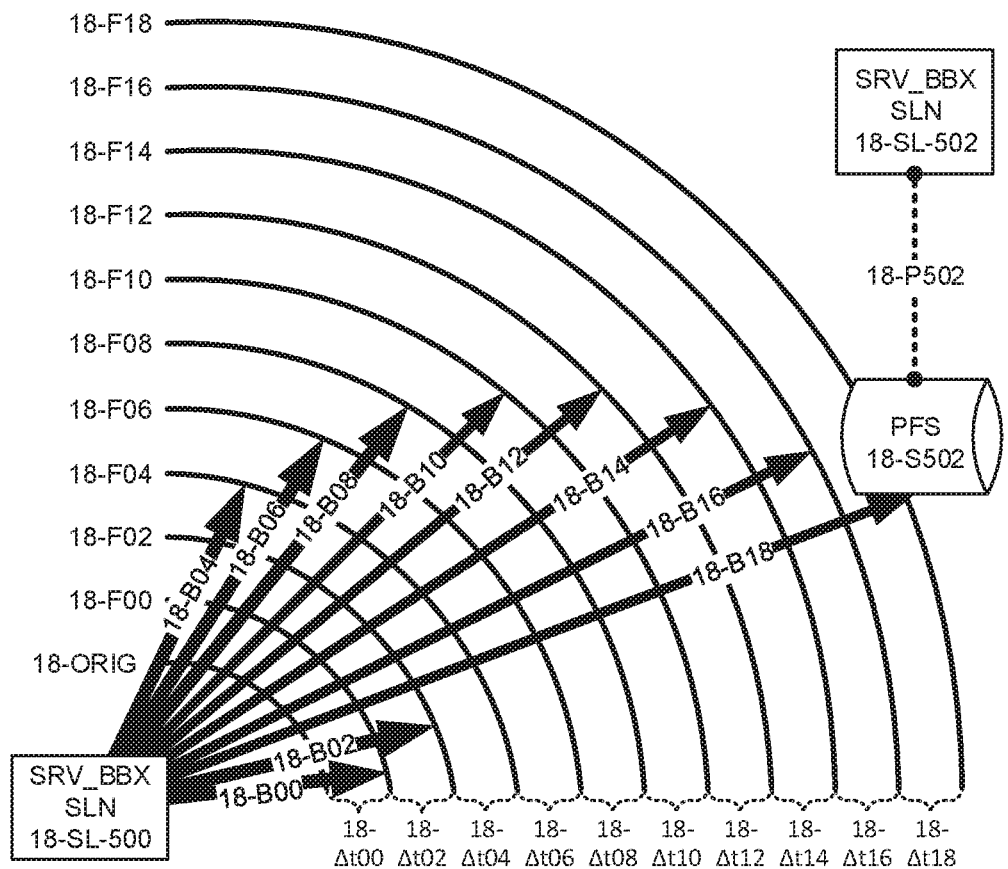
FIG. 18 illustrates a series of data beacon pulses.

FIG. 18 illustrates a series of data beacon pulses. This example illustrates the data beacon pulser mechanism in pulsing mode producing a series of pulses at either a set frequency or variable durations of time. A pulse could also be referred to as a flash or a series of flashes. Beacon pulses are transmitted from origin like ripples of information to targets. They can be sent to one or more PFS 18-S502 storage devices of access and use by backbone exchange server (SRV_BBX) and sling node (SLN) 18-SL-502 in a remote region.

Each flash can contain a carrier file consisting of a complete market snapshot at each moment, or it can also carry only the information changed since last pulse was sent. As noted above, the utility value of DBP to financial markets is presented as one use case example. DBP has utility value to many other industries and applications.

Figure 19:
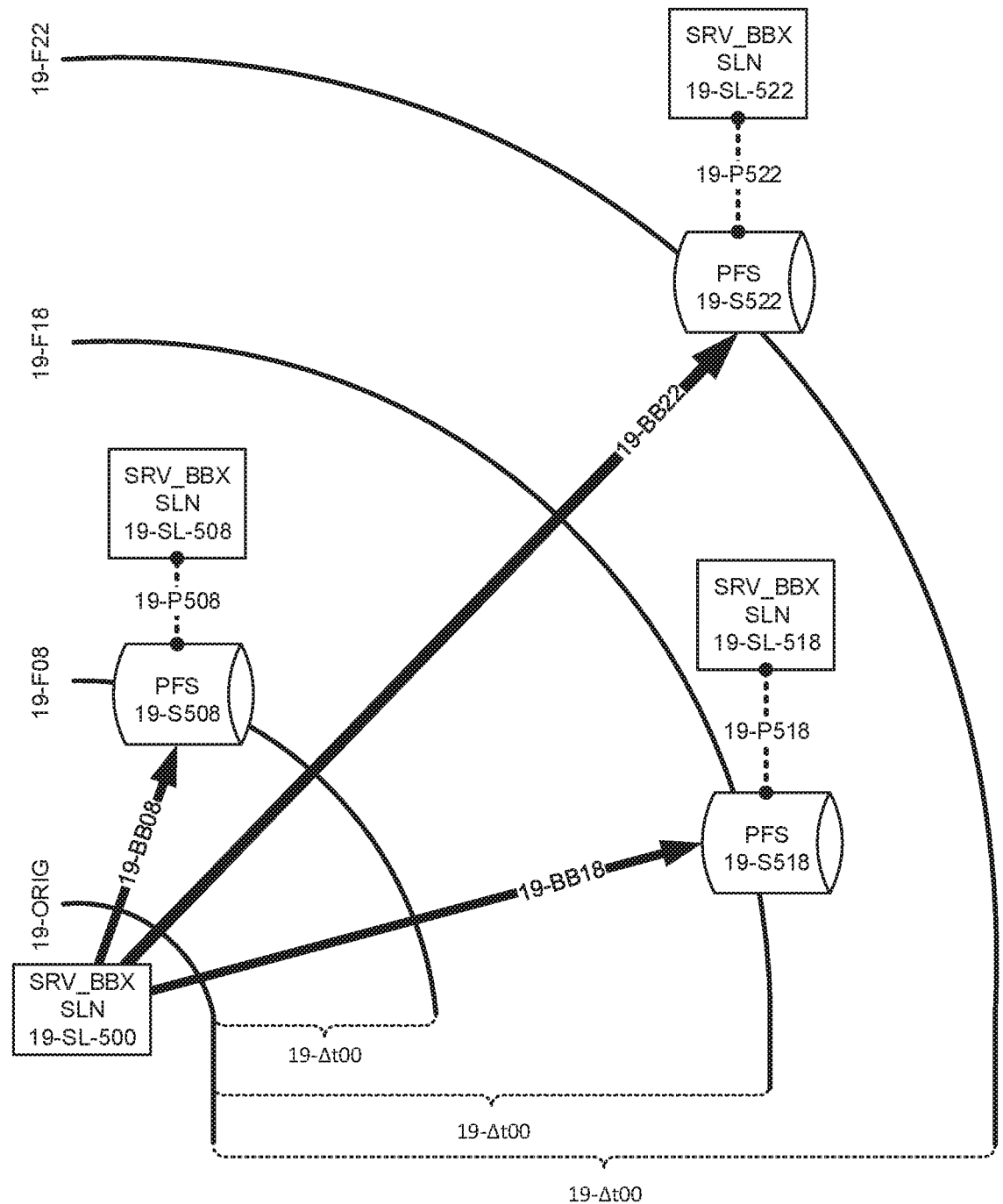
FIG. 19 illustrates simultaneous data beacon pulses.

FIG. 19 illustrates simultaneous data beacon pulses. This example illustrates the simultaneous sending of multiple duplicate Beacon pulses multi-cast to various targets at different distances. Like UDP/IP multi-cast it is sending streams of information, but where it differs is that this mechanism is more reliable and more efficient running at close to wire-speed regardless of distance or data size being transmitted.

The utility value could be for stock trading, dissemination of changing information such as weather, wind speed, pollution measures, CDN replication, or other information sending across any distance by any industry.

Another perspective is that it is a multi-directional/multi-destination concurrently sending of DBP batches. Near widespread information conveyance can be regionally aggregated on local servers with availability to all clients in each of one or more remote regions where clients in each region can access servers which are fed information by DBP. These servers can serve this information to the clients via traditional RTT C-S framework there allowing for full integration into existing IP-based network work flows while still realizing the advantages of DBP over the long-haul distances.

Figure 20:
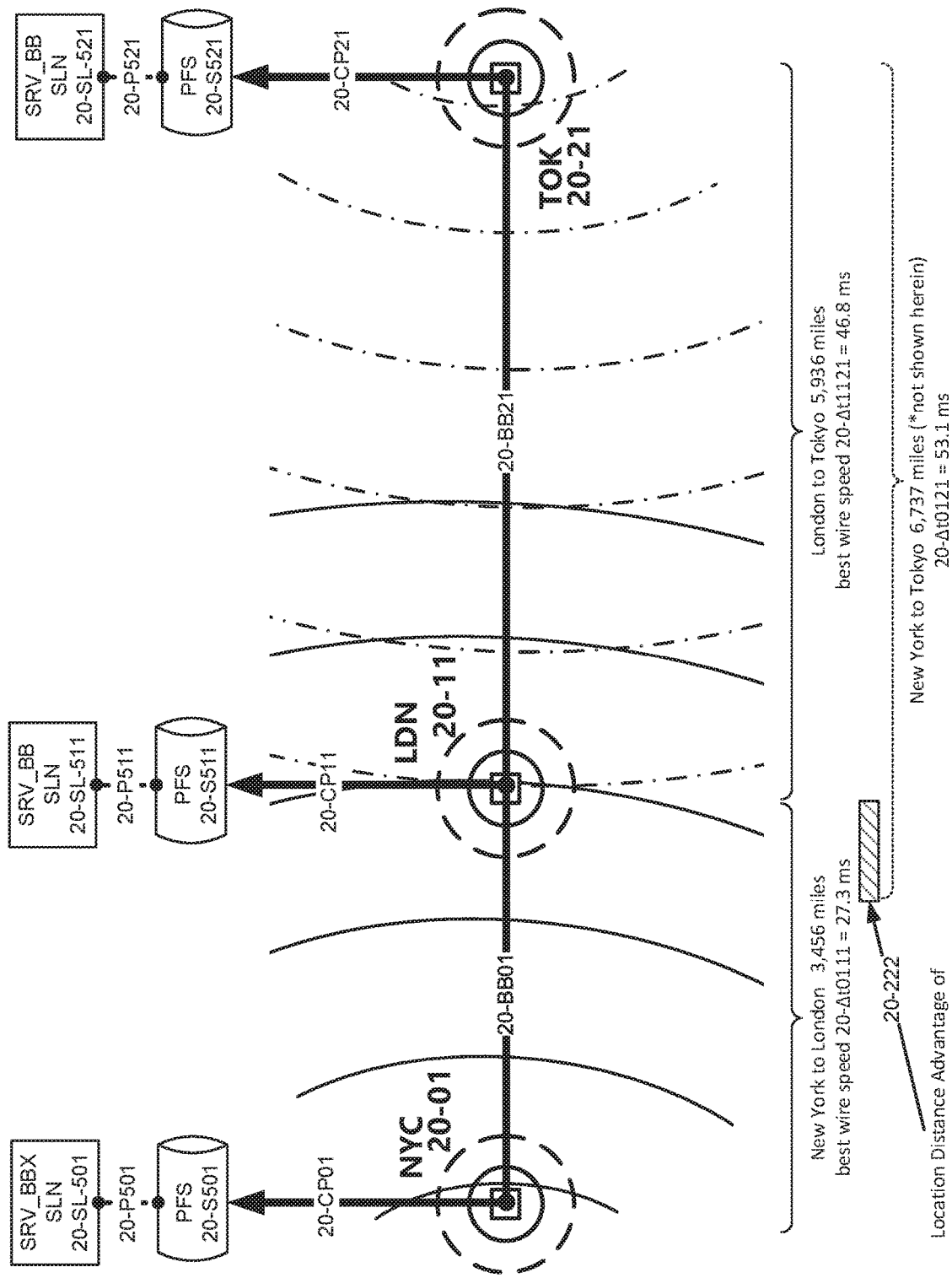
FIG. 20 illustrates the intersection of multiple pulses and flashes.

FIG. 20 illustrates the intersection of multiple pulses and flashes. This example illustrates data beacon pulser (DBP) at the intersection of multiple pulses and flashes. Example of DBP intersection points presents an advantageous positioning of a super computer node (SCN) or high performance computing node (HPC) for evaluating information about three or more markets, in this example, two remote and one local.

London LDN 20-11 is the most equidistant point between the three markets of New York NYC 20-01, Tokyo TOK 20-21, and London LDN 20-11. Therefore, there is a slight time advantage to trade from the one of the three places with the SCN or HPC located in London LDN 20-11. If the information from all three markets is important and can often originate from any one market, the best location is based on weighting the source of information, and also where the client trades most locally, using information from other markets.

The area highlighted by 20-222 demonstrates the time advantage of locating the central node in London where there is a location distance advantage of 801 miles 20-Δt222 which equals a savings of 6.3 ms. This demonstrates the information advantage that London has between the three financial markets of New York, London and Tokyo.

Figure 21:
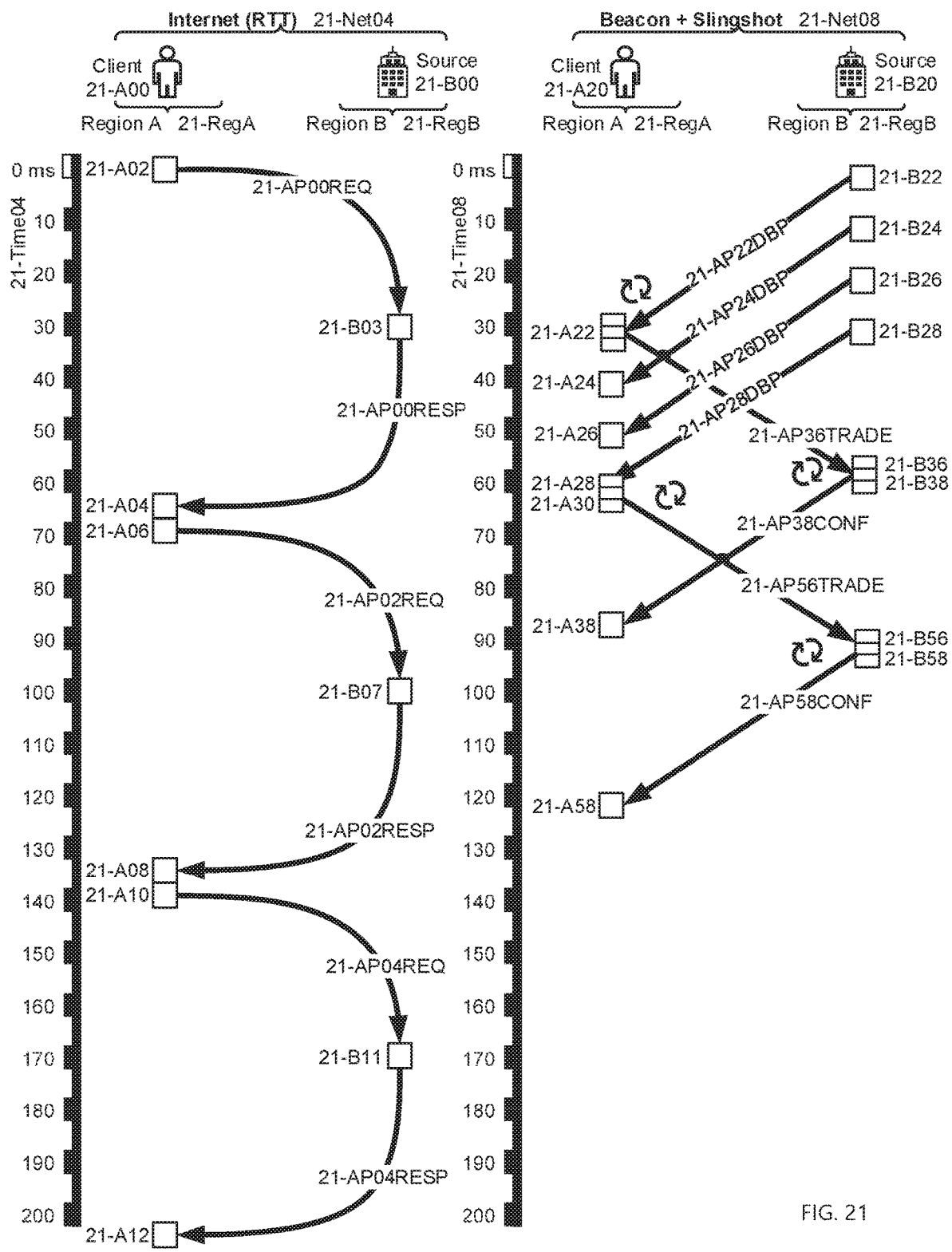
FIG. 21 illustrates the timing for an example stock trade.

FIG. 21 illustrates the timing for an example stock trade. While slingshot powered data beacon pulser (DBP) can be beneficial in various applications, as an example, its utility value in financial applications is illustrated herein. This industry needs reliability with as fast and efficient data transport as possible. Often, the first to get information and to be able to act on it is the one that has the advantage and therefore wins out over those who are slower or less informed.

This example compares the traditional internet (RTT) request-response series 21-NET-04 of REQ-RESP loops versus Data Beacon Pulser (DBP) powered by slingshot 21-NET-08. In each column, there are three highlighted stages for a trade which are information conveyance, trade execution order, and trade confirmation.

In each column are a client 21-A00 and 21-A20 in region A 21-RegA and a source 21-B00 and 21-B20 in region B 21-RegB. This is illustrated as a greatly simplified network topology to focus on the long-distance hops between region A 21-RegA and region B 21-RegB.

Internet (RTT) 21-Net04 from Region A 21-RegA to Region B 21-Reg B and back to Region A 21-RegA utilizes packetized data with an assumed small packet size within the MTU of 1500 or 576. The first stage in this internet RTT column is a request for information path from point 21-A02 by client 21-A00 to 21-APOOREQ Source 21-B00 point 21-B03 with a return 21-APOORESP to point 21-A04. The second stage is a trade execution request made via point 21-A06 by client 21-A00 to 21-APO2REQ Source 21-B00 point 21-B07 with a return 21-APO2RESP to point 21-A08. The third stage is for a trade confirmation request made via point 21-A10 by client 21-A00 via 21-APO4REQ to Source 21-B00 point 21-B11 with a return 21-APO4RESP to point 21-A12.

In the case of Data Beacon Pulser (DBP) combined with slingshot 21-Net08, the information is a series of one-way transfers. DBP sends complete files and has no limit to file sizes without a need for packetization nor does it require multi-part payloads that would have to otherwise be carried by multiple packets.

An example of multiple DBP pulses illustrating the stage one market data information conveyance is noted by 21-AP22DBP, 21-AP24DBP, 21-AP26DBP, and 21-AP28DBP. These are published by the Source 21-B20 in region B 21-RegB and received by client 21-A20 in region A 21-RegA on an ongoing, regular basis. Information may consist of a snapshot of entire dataset or this information could also be a differential of changes made to the information since the sending of previous data set.

There are two stage two trade execution request submissions illustrated by 21-AP36TRADE and 21-AP56TRADE from client 21-A20 in region A 21-RegA sent to source 21-B20 in 21-RegB. There are also two stage three trade confirmations illustrated by 21-AP38CONF and 21-AP58CONF from source 21-B20 in 21-RegB sent to client 21-A20 in region A 21-RegA.

There are two timelines 21-Time04 and 21-Time08, both starting at the same instant, each from 0 ms with 10 millisecond (ms) intervals going down this illustration up to 200+ ms. While the actual geographic locations are not indicated herein, the latency between points is similar to the latency between two major financial hubs of New York and London. Internet 21-Net04 RTT is at least 65 ms and averages about 73 ms between these two points. Beacon and Slingshot one way transport are at least 30 ms one way.

Markets move based on changes to information causing either supply to outstrip demand putting downward pressure on pricing or conversely causing demand to outstrip supply pushing pricing upwards. In this illustration, if news happens at time 0 ms, a client using RTT 21-Net04 will make a request starting at point 21-A02 and this request will be fulfilled by source 21-B00 at point 21-B03, and the earliest that they will receive information is at point 21-A04.

The client 21-A20 who is on the receiving end of data beacon pulser 21-Net08, will have received four or more intervals of information via DBP. The actual frequency can be much more often. A few key points are with regards to where information which could move markets originates. Another point to bring up is that the RTT 21-Net04 information request RTT loops can be much more frequent as well when a client 21-A00 is focused on a specific market. In that instance, the marginal advantage of DBP and Sling transport provides the advantage of letter its clients 21-A20 be first to market compared with 21-A00 clients.

However, in an instance when external information or market movement information is the impetus for a request for market information to focus on and on which to base trading decisions, DBP and Sling provide significant advantages. Whether the information is first known in Region A 21-RegA or Region B 21-RegB, FIG. 21 illustrates the advantage of DBP and Sling.

If the information originates in Region B 21-RegB at 0 ms, it is known to client 21-A20 in Region A 21-RegA via 21-AP22DBP at point 21-A22 just over the 30 ms mark, and the client 21-A20 can respond by placing a trade order via 210AP36TRADE which is received by the market at just over the 60 ms mark at point 21-B36. Confirmation of the trade is received by the client 21-A20 at approx. the 90 ms mark at point 21-A38. At the earliest time that client 21-A00 receives market pricing information 21-A04, client 21-A20 has already received more market information and can choose to place another trade order at point 21-A30 via 21-AP56Trade to be executed by market at point 21-B56. The timelier and more thorough the information, the greater the advantage to the trader.

FIG. 21 is not to scale. There will be a more pronounced time advantage over longer distance. Therefore, the granularity of the time advantage must be measured in finer measurement units within shorter path distances. One other factor is that RTT internet packets are sent on a best efforts basis and timing is expectant. DBP and Slingshot are determinate in that the transport is reliable and time known.

The time advantage offered by DBP and Slingshot example in the financial world can also be advantageous in other use case scenarios.

Figure 22:
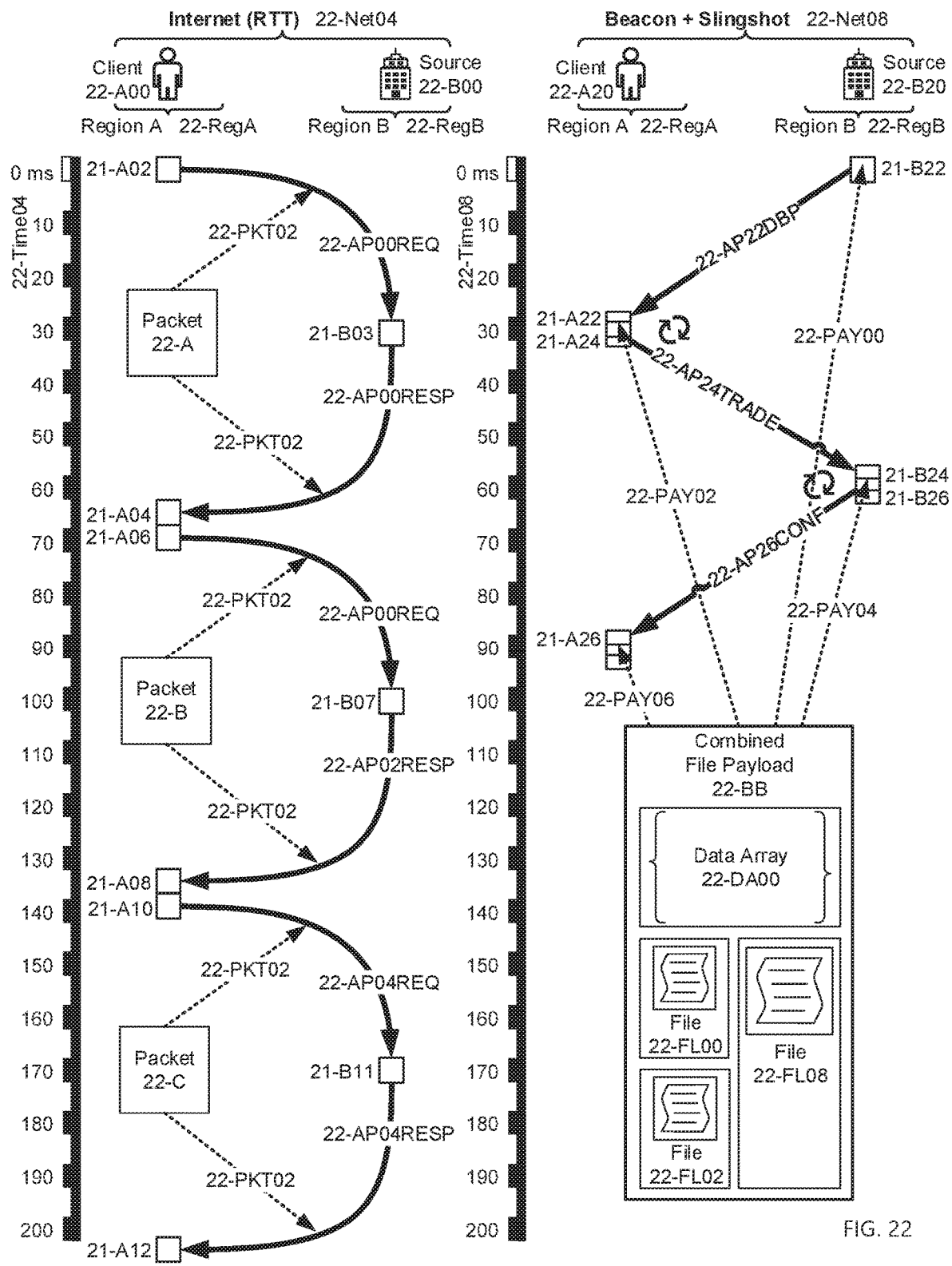
FIG. 22 illustrates the timing for an example stock trade.

FIG. 22 illustrates the timing for an example stock trade. This figure is like FIG. 21 with added example embodiments to illustrate the packetization transport of internet (RTT) 22-Net04 versus the any-sized file payload transport of DBP and Slingshot 22-Net08.

Packets 22-A, 22-B, and 22-C must be smaller than the maximum transmission until of all hops in the internet path through which they transit. This is typically 1500 bytes. That means that any data which is larger than that or series of data will require multiple packets. When receiving information, it requires the aggregating of packetized date and analyzing. When sending a series of instructions, such as trade orders, it requires sending multiple orders from client to market.

The combined file payload of a sling packet 22-BB can contain many different data elements, such as a data array 22-DA00, or various sized files such as 22-FL00, 22-FL02, or 22-FL08. This has the advantage of receiving information in bulk for a more comprehensive view as well as offering the facility to send more complex trading information, such as an algorithm to be processed as close to market as possible.

This is paradigm shift offers traders more options, flexibility and advantages.

Figure 23:
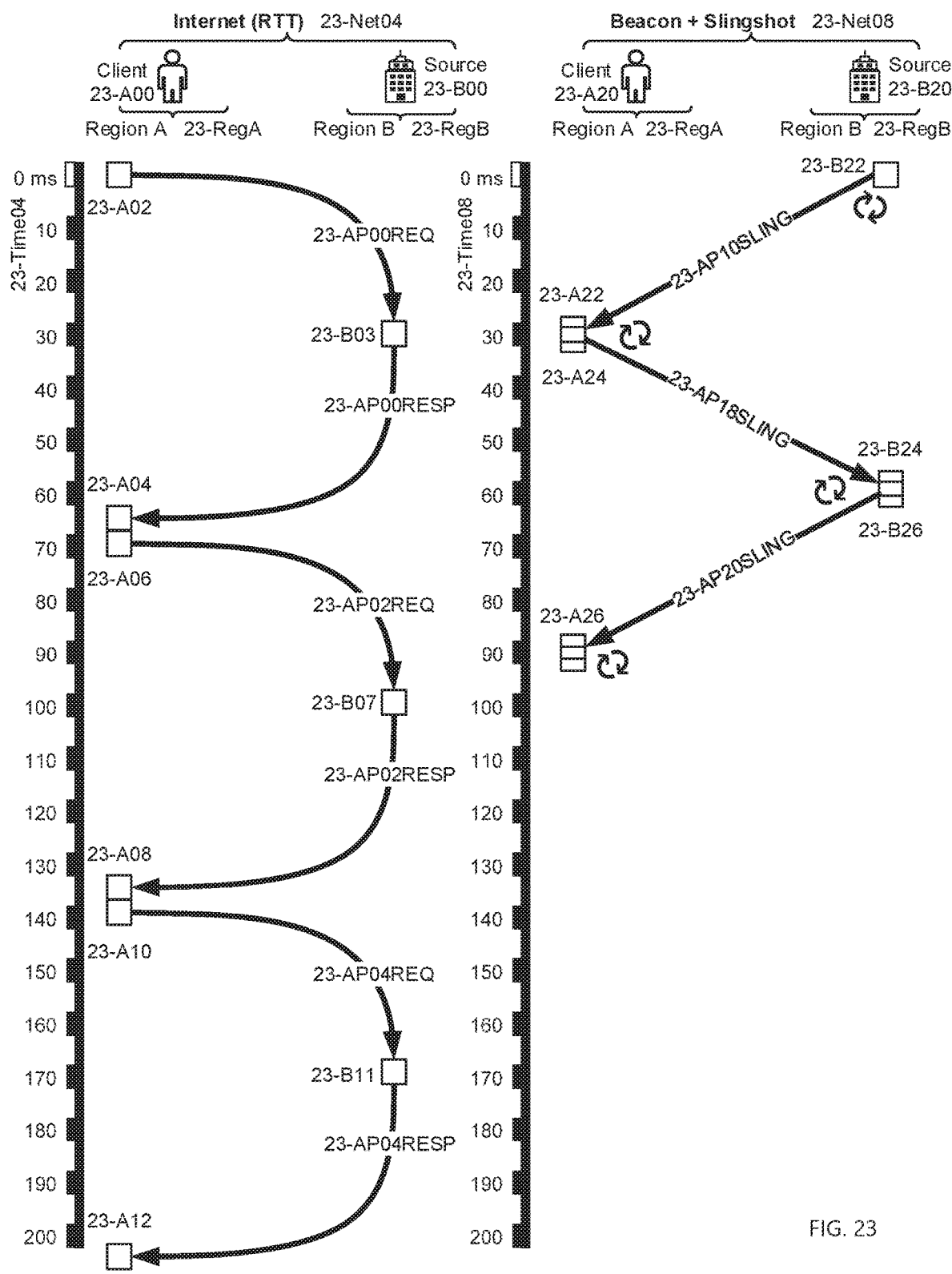
FIG. 23 illustrates the timing for an example stock trade.

FIG. 23 illustrates the timing for an example stock trade. This figure is based on both FIG. 21 and FIG. 21. It simplifies the comparison between internet RTT 23-Net04 and Beacon and Slingshot 23-Net-08. Efficiency gain is made over the complete information cycle.

Figure 24:
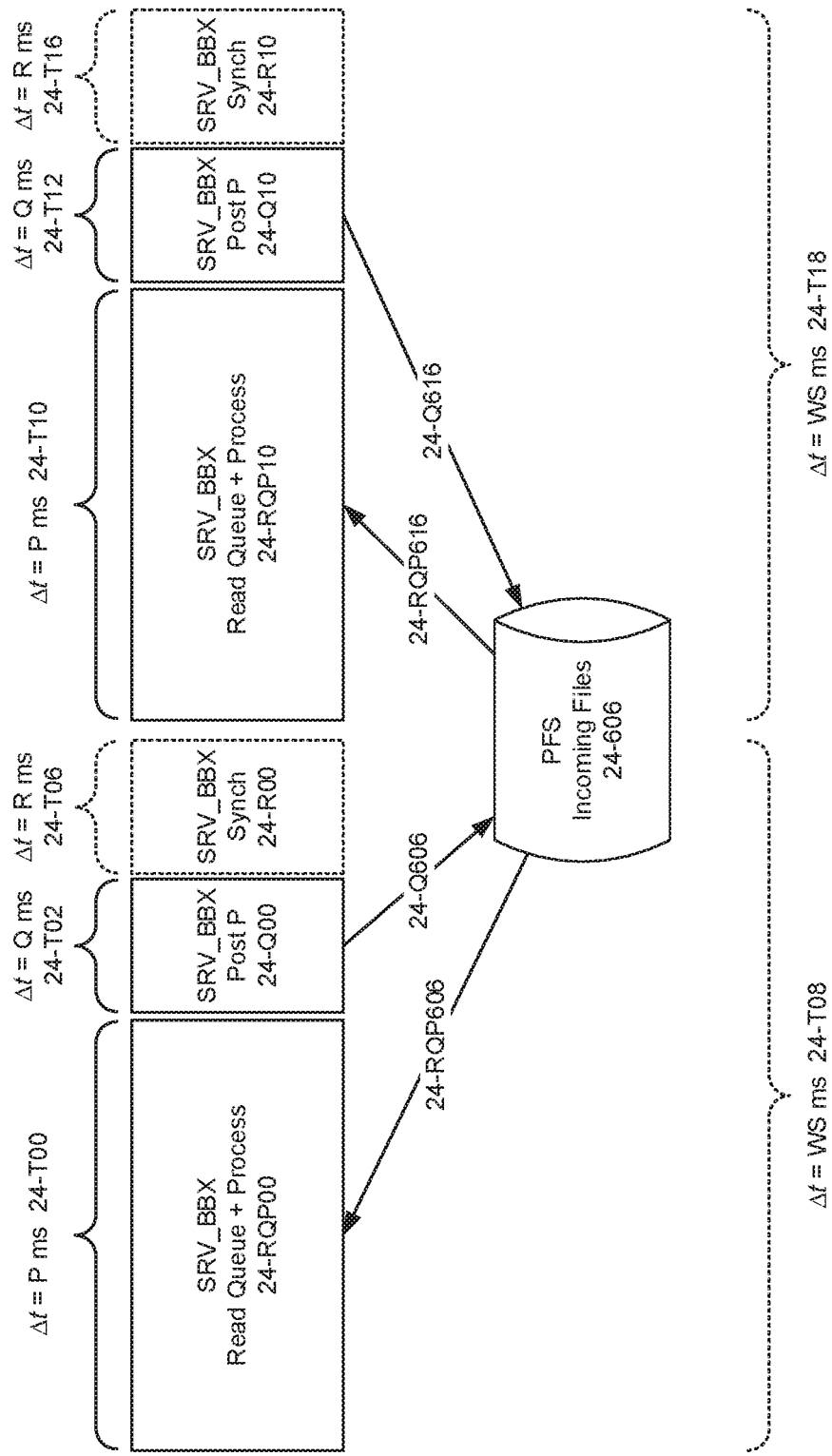
FIG. 24 illustrates the granularity of a tick.

FIG. 24 illustrates the granularity of a tick. This figure illustrates two ticks 24-T08 and 24-T18 as consistent beacon intervals. This example demonstrates two batch file pulls on a backbone exchange server (SRV_BBX) with Read Queue+Process 24-RQP00 and Read Queue+Process 24-RQP10. They both pull files from the same storage media parallel file system PFS Incoming Files 24-606. Files pulled in 24-RQP00 via path 24-RQP606 are processed and then in post processing Post P 24-Q00 the files are marked via path 24-Q606.

This is a critically important point because the next batch file pull Read Queue+Process 24-RQP10 from PFS Incoming Files 24-606 via path 24-RQP616 should only include unmarked files or files not filled by previous batches. Then at Post P 24-Q10 the files pulled and used are marked via path 24-Q616 so that they will not be inadvertently pulled by a subsequent batch file pull.

Figure 25:
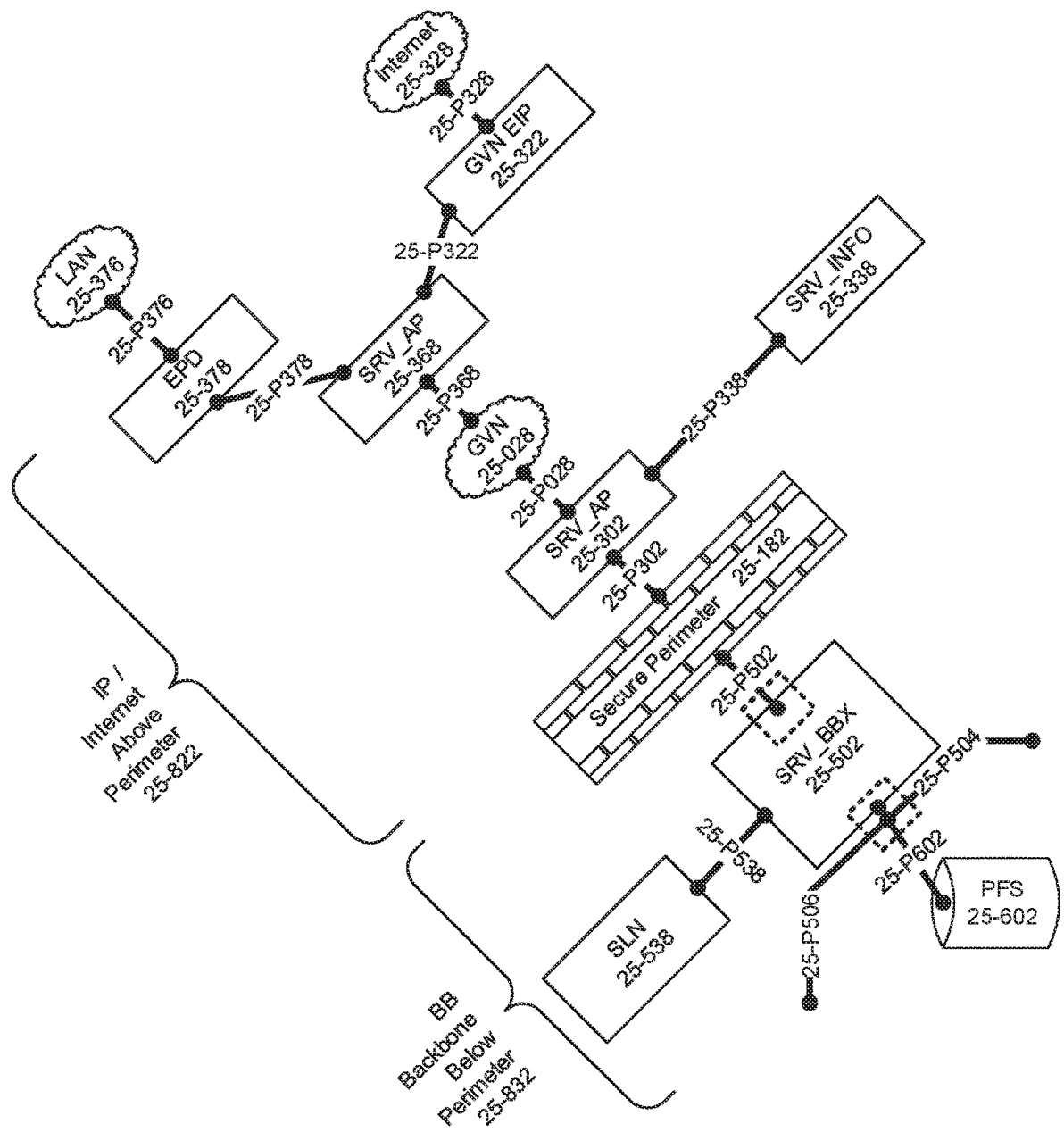
FIG. 25 illustrates how the GVN can incorporate technologies such as Network Slingshot.

FIG. 25 illustrates how the GVN can incorporate technologies such as Network Slingshot. This example illustrates the topology of DBP and Slingshot integrated into a framework such as a GVN or other such structure including sling node (SLN) 25-538, information server (SRV_INFO) 25-388 and other devices. DBP and Slingshot can either be standalone or work within existing network fabrics.

The first boundary is GVN EIP 25-322 between the internet and the GVN. The next boundary is the secure perimeter 25-182. This layered security approach protects the core infrastructure which the GVN is predicated upon.

The secure perimeter 25-182 boundary between GVN and GVN backbone protect the high speed global network. The section of the GVN above the perimeter 25-822 has traffic flowing over the top (OTT) the open internet via secure GVN tunnels. Under the secure perimeter 25-182, GVN connections utilize various protocols over dark fiber or other connectivity which are not directly reachable from the internet.

A sling node 25-538 can operate inside of (below) the secure perimeter 25-832 which can operate a true internal network with advanced features such as remote direct memory access (RDMA) to a parallel file system (PFS) 25-602 device.

Figure 26:
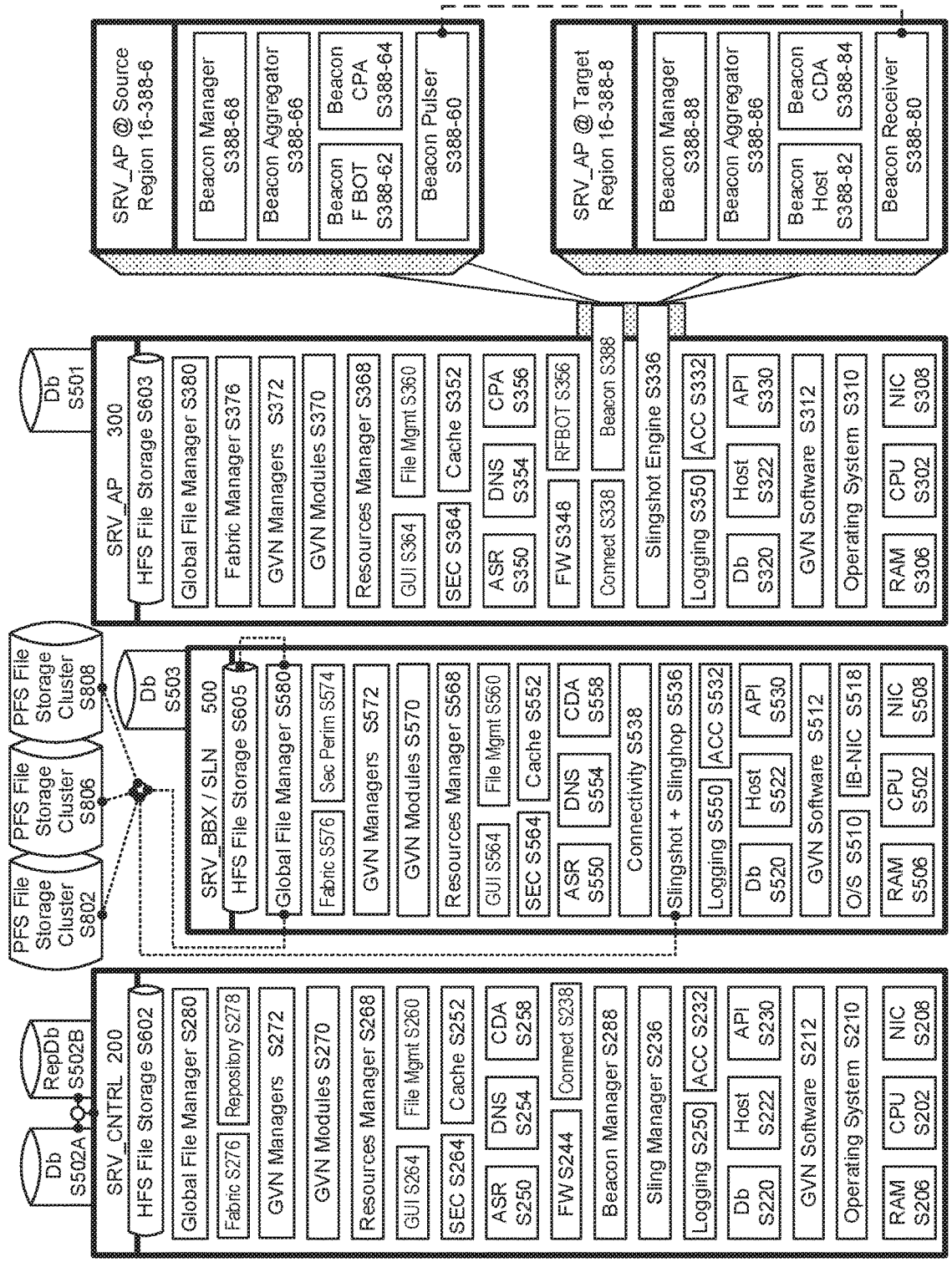
FIG. 26 illustrates a system diagram with Beacon and other logic.

FIG. 26 illustrates a system diagram with Beacon and other logic. This example embodiment demonstrates the stack of three devices, an access point server (SRV_AP) 300, a central, control server (SRV_CNTRL) 200, and a backbone exchange server (SRV_BBX) sling node (SLN) 500, plus SRV_AP 16-388-6 and 16-388-8.

At SRV_BBX SLN 500, may also have one slingshot devices between it and the internet path. In this topology, SRV_BBX is infrastructure between internet and the backbone utilizing two reciprocal mechanisms. The slingshot router scan act as a path enabler for one way or two way DBP. For example, in the internet data center (IDC), there can be a series of slingshot routes as a front face. This mechanism can be configured for slingshot and it can be administered.

SRV_CNTRL 200 can include one or more of the following modules/components parts: HFS File Storage S602, Global File Manager S280, Fabric S276, Repository S278, GVN Managers S272, GVN Modules S270, Resources Manager S268, GUI S264, File Mgmt S260, SEC S264, Cache S252, ASR S250, DNS S254, CDA S258, FW S244, Connect S238, Beacon Manager S288, Sling Manager S236, Logging S250, ACC S232, Db S220, Host S222, API S230, GVN Software S212, Operating System S210, RAM S206, CPU S202, and NIC S208. SRV_CNTRL 200 can communicate with Db 5502A and/or RepDb 5502B.

SRV_BBX 500 can include one or more of the following modules/components parts: HFS File Storage S605, Global File Manager S580, Fabric S576, Sec Perim S574, GVN Managers S572, GVN Modules S570, Resources Manager S568, GUI S564, File Mgmt S560, SEC S564, Cache S552, ASR S550, DNS S554, CDA S558, Connectivity S538, Slingshot+Slinghop S536, Logging S550, ACC S532, Db S520, Host S522, API S530, GVN Software S512, O/S S510, IB-NIC S518, RAM S506, CPU S502, and NIC S508. SRVBBX 500 can communicate with Db S503. PFS File Storage Clusters S802, S806, S808 can communicate with Global File Manager S580 and/or Slingshot+Slinghop S536.

SLN 900 can include one or more of the following modules/components parts: HFS File Storage S606, Global File Manager S980, Fabric Manager S976, GVN Managers S972, GVN Modules S970, Resources Manager S968, Beacon S988, Availability S980, Slingshot Engine S936, Logging S950, ACC S932, Db S920, Host S922, API S930, GVN Software S912, O/S S910, RAM S906, CPU S902, and NIC S908. SLN 900 can communicate with Db S501.

SRV_AP 16-388-6 can include one or more of the following modules/components parts: Beacon Manager S388-68, Beacon Aggregator S388-66, Beacon F BOT S388-62, Beacon CPA S388-64, Beacon Pulser S388-60. SRV_AP 16-388-8 can include one or more of the following modules/components parts: Beacon Manager S388-88, Beacon Aggregator S388-86, Beacon Host S388-82, Beacon CPA S388-84, Beacon Receiver S388-80. Beacon Pulser S388-60 can communicate with Beacon Receiver S388-80.

Some key elements have been highlighted. More elements may be present which have not been noted. Some of the elements noted are not directly influenced by, dependent on, or otherwise integrated with Slinghop but have been noted to show where in the stack that that items may be placed. The hierarchy and placement of items may indicate levels with elements near the top as high level items, and items at the bottom as lower level items. For example the network interface card (NIC) S108, S308, S208, and S508 are all at a very low system level. The Operating System (O/S) S110, S310, S210, and S510 are above the NIC level and within the O/S there are driver files which interface with and operate the NIC. Some elements noted (and others not noted) may be at the appropriate level relative to other elements or they may need to be lower or higher, depending on use, context and other factors.

Other elements of GVN, slingshot, Slinghop or other related technologies also include fabric manager, logging, AI, security, FW, secure boot manager (SBM), back channel mechanism (BCM), geographic destination (Geo-D), Resources Manager, GVN Modules, APPs, advanced smart routing (ASR), GVN Manager, Accounting, and others.

Slingshot manager manages hop listener, file buffer module (receive), file buffer manager (send), hop router, file sender, and other items.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. In addition, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, systems, methods and media for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A network system for providing data beacons, comprising:
   a first node comprising a first read queue, a first write queue, and a first parallel file system;
   a second node comprising a second read queue, a second write queue, and a second parallel file system;
   wherein the first node writes first data from the first write queue to the second parallel file system; and
   wherein the second node reads the first data from the second parallel file system and places the first data in the second read queue.

2. The network system of claim 1, wherein the second node writes second data from the second write queue to the first parallel file system; and
   wherein the first node reads the second data from the first parallel file system and places the second data in the first read queue.

3. The network system of claim 1, wherein the first data is a carrier file comprising a header, a body, and a footer.

4. The network system of claim 3, wherein the first nodes subsequently writes additional data to the first parallel file system.

5. The network system of claim 4, wherein the additional data is written at a set frequency.

6. The network system of claim 4, wherein the additional data only contains information that has changed since the first data was written.

7. The network system of claim 1, further comprising a third node comprising a third read queue, a third write queue, and a third parallel file system;
   wherein the first node writes first data from the first write queue to the second and third parallel file systems at the same time; and
   wherein the third node reads the first data from the third parallel file system and places the first data in the third read queue.

* * * * *